US011139509B2

(12) United States Patent
Konopka et al.

(10) Patent No.: US 11,139,509 B2
(45) Date of Patent: Oct. 5, 2021

(54) APPARATUS, SYSTEM AND METHOD FOR DENDRITE AND ROUGHNESS SUPPRESSION IN ELECTROCHEMICAL STRUCTURES

(71) Applicant: Iontra LLC, Denver, CO (US)

(72) Inventors: Daniel A. Konopka, Denver, CO (US); Reuben Sarkar, Denver, CO (US)

(73) Assignee: Iontra LLC, Denver, CO (US)

( * ) Notice: Subject to any disclaimer, the term of this patent is extended or adjusted under 35 U.S.C. 154(b) by 201 days.

(21) Appl. No.: 16/247,435

(22) Filed: Jan. 14, 2019

(65) Prior Publication Data

US 2019/0221895 A1 Jul. 18, 2019

Related U.S. Application Data

(63) Continuation-in-part of application No. 15/649,633, filed on Jul. 13, 2017, now Pat. No. 10,697,083.

(Continued)

(51) Int. Cl.
*H02J 7/00* (2006.01)
*H01M 10/42* (2006.01)
(Continued)

(52) U.S. Cl.
CPC ....... *H01M 10/4235* (2013.01); *H01M 4/628* (2013.01); *H01M 10/44* (2013.01);
(Continued)

(58) Field of Classification Search
None
See application file for complete search history.

(56) References Cited

U.S. PATENT DOCUMENTS 3,923,550 A * 12/1975 von Krusenstierna ............. H01M 10/4214
429/68
2014/0084849 A1 3/2014 Lee et al.
(Continued)

FOREIGN PATENT DOCUMENTS

WO 2009060248 5/2009
WO 2017184482 10/2017

OTHER PUBLICATIONS

International Searching Authority, International Search Report and Written Opinion, issued for International Applicaiton No. PCT/US2019/013533, dated May 15, 2019 (16 pages).

(Continued)

*Primary Examiner* — Arun C Williams
(74) *Attorney, Agent, or Firm* — Polsinelli PC; Gregory P. Durbin

(57) ABSTRACT

A method, and associated batteries and battery charging units, that involve inducing electric and/or magnetic fields (field-induced current) across an electrode of a electrochemical cell, such as an anode of a battery. The field and current across the electrode may be referred to herein as a transverse current as this current is typically transverse to the ionic charge current that may be applied when charging a battery. The field and current may be induced from connecting AC energy, e.g., AC current, across the electrode or at a discrete point or points of the electrode. The induced field and current may suppress dendrite growth, experienced in conventional batteries without AC energy, among other advantages.

16 Claims, 16 Drawing Sheets

Related U.S. Application Data

(60) Provisional application No. 62/617,103, filed on Jan. 12, 2018, provisional application No. 62/361,650, filed on Jul. 13, 2016.

(51) Int. Cl.

| | | |
|---|---|---|
| *H02J 7/02* | (2016.01) | |
| *H01M 4/62* | (2006.01) | |
| *H01M 10/44* | (2006.01) | |
| *H01M 10/052* | (2010.01) | |
| *H01M 10/0525* | (2010.01) | |
| *H01M 4/587* | (2010.01) | |

(52) U.S. Cl.
CPC .......... *H02J 7/0069* (2020.01); *H02J 7/0071* (2020.01); *H02J 7/00711* (2020.01); *H02J 7/02* (2013.01); *H01M 4/587* (2013.01); *H01M 10/052* (2013.01); *H01M 10/0525* (2013.01)

(56) References Cited

U.S. PATENT DOCUMENTS

| | | | |
|---|---|---|---|
| 2016/0261005 A1* | 9/2016 | Rustomji | H01G 11/60 |
| 2017/0179538 A1* | 6/2017 | Christensen | G01R 31/44 |
| 2017/0179546 A1 | 6/2017 | Castaneda et al. | |

OTHER PUBLICATIONS

Lacressonniere, F. et al., Influence of a Charging Current with a Sinusoidal Perturbation on the Performance of a Lead-Acid Battery, IEE Proceedings—Electric Power Applications, 152(5):1365-1370, Sep. 2005.

Park, J. et al., Micro-Patterned Lithium metal Anodes with Suppressed Dendrite Formation for Post Lithium-Ion Batteries, Advanced Functional Materials, 3(11):1600140, Apr. 6, 2016.

Ryou, M.H. et al., Mechanical Surface Modification of Lithium Metal: Towards Improved Li metal Anode Performance by Directed Li Plating, Advanced Functional Materials, 25(6):834-841, Dec. 2, 2014.

\* cited by examiner

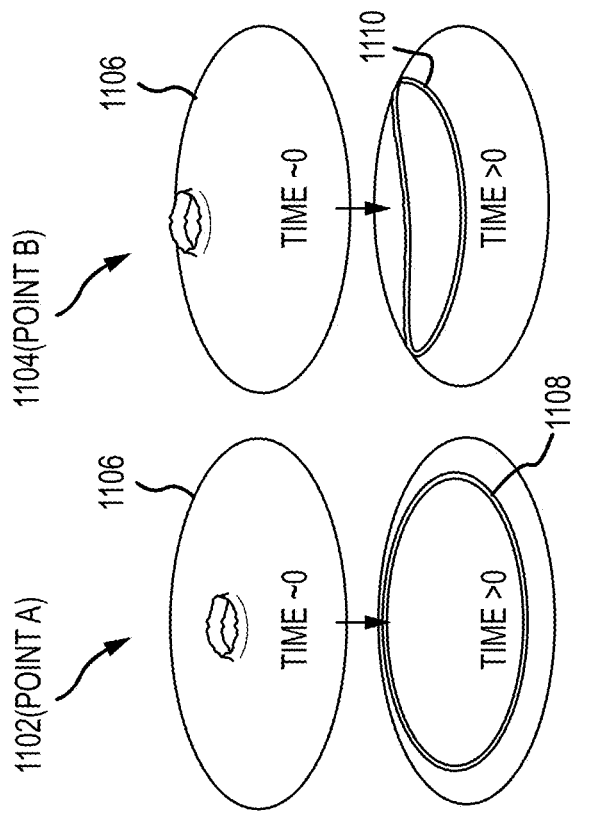
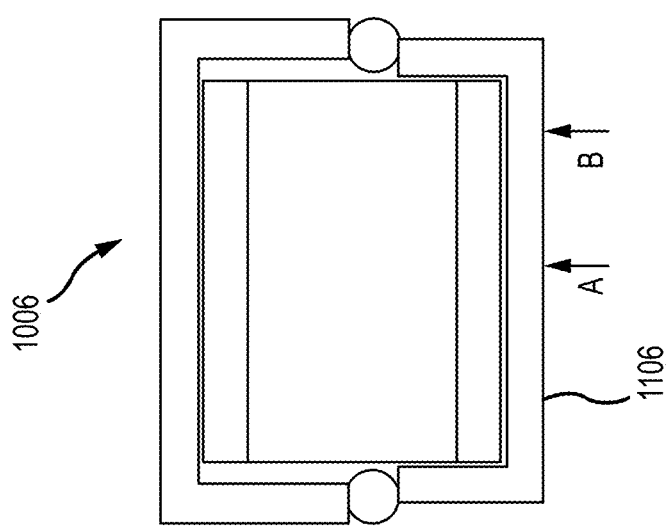
FIG.11

APPARATUS, SYSTEM AND METHOD FOR DENDRITE AND ROUGHNESS SUPPRESSION IN ELECTROCHEMICAL STRUCTURES

CROSS-REFERENCE TO RELATED APPLICATIONS

This application is related to and claims priority under 35 U.S.C. § 119(e) from U.S. Patent Application No. 62/617,103 filed Jan. 12, 2018 entitled "APPARATUS, SYSTEM AND METHOD FOR DENDRITE AND ROUGHNESS SUPPRESSION", the entire contents of which is incorporated herein by reference for all purposes.

This application is also a continuation-in-part of U.S. Nonprovisional patent application Ser. No. 15/649,633 entitled "ELECTROCHEMICAL METHODS, DEVICES AND COMPOSITIONS," filed Jul. 13, 2017, which claims priority under 35 U.S.C. § 119 to U.S. Provisional Patent Application No. 62/361,650 entitled "ELECTROCHEMICAL METHODS, DEVICES AND COMPOSITIONS," filed on Jul. 13, 2016, both of which are hereby incorporated by reference in their entirety for all purposes.

TECHNICAL FIELD

Aspects of the present disclosure involve electrochemistry, and particularly electrochemical structures, such as a battery, and method and devices for suppression of the growth of dendrites and the like in the same.

BACKGROUND

Batteries generally comprise one or more electrochemical cells of sources of a countercharge and first electrode layers separated by an ionically conductive barrier, often a liquid or polymer membrane saturated with an electrolyte. These layers are made to be thin so multiple units can occupy the volume of a battery, increasing the available power of the battery with each stacked unit. As these components become thinner, they also become more fragile. Further, as the electrodes become thinner, a larger ohmic drop occurs across the surface leading to less uniform charge density during charge/discharge cycles. Further still, battery electrodes may obtain growths (or dendrites) during charge cycles of the battery that may further damage the battery or degrade battery performance.

For example, lithium ion batteries typically have a metal oxide electrode (M is typically iron, cobalt, manganese) and a carbon electrode coated on metal current collectors. The metal oxide serves to attract and stabilize lithium ions during discharge of the battery and usually determines the cell's operating potential. The metal oxide electrode is initially in an oxidized state while the carbon is graphite infused with lithium ions. During discharging (that is, normal use of the battery to provide power to a device), the $Li^+$ ions diffuse between graphene layers to edge sites of the graphite, and then through the solid electrolyte interphase (SEI). The SEI is a layer that forms when lithium initially reacts with components of the organic electrolyte, comprised of inorganic and organic byproducts. Being less conductive to both electrons and ions compared to the graphite and electrolyte, respectively, the properties and quality of the SEI tend to determine the cell's overall performance. From the SEI, lithium ions continue to diffuse through the ion transport layer and toward the metal oxide, which becomes reduced to $LiM_xO_y$. During charging, the $Li^+$ ions follow the opposite path and instead ultimately diffuse back through the SEI and intercalate back into the carbon. Under ideal charging conditions, lithium ions are able to enter the graphite at edge sites (rate limiting step) without excess polarization that might result in plating. Problems with plating arise if the cell voltage becomes too high, the electrode is too polarized, or the SEI is porous, non-uniform, or too thick or thin. In extreme cases, $Li^0$ aggregation in the form of dendrites may create an explosion hazard within the battery. Specifically, if the $Li^0$ reaches the opposite electrode, the battery may short and the dendrites formed during the $Li^0$ deposition may damage the membrane dividing the two divisions of the battery.

In the case of lithium metal electrodes or the event of plating on graphite electrodes, the deposits become increasingly rough with subsequent charge/discharge cycles. Lithium-metal batteries (Li-foil anode) and lithium-ion batteries (Li-ions intercalated into a graphite/foil anode, where the current collector is frequently copper) both suffer from the growth of lithium dendrites during the battery's charging cycles. While Li-ion anodes can be stable for hundreds of cycles, dendrites develop immediately in Li-metal. Once formed, the dendrites lower the coulumbic efficiency of the battery, damage the ion membrane, and may short the battery if the dendrites contact the anode. Commonly dendrites form which puncture or irreversibly damage the electrolyte membrane. If dendritic growth reaches the opposing electrode, then the battery is permanently shorted and cannot be recovered.

It is with these issues in mind, among others, that aspects of the present disclosure were conceived.

SUMMARY

The following embodiments and aspects thereof are described and illustrated with systems, tools and methods meant to be exemplary and illustrative, not limiting in scope. In various embodiments, one or more of the above-described problems have been reduced or eliminated, while other embodiments are directed to other improvements.

Provided herein are methods for optimally maintaining the electrodes in an electrochemical cell, such as a battery, whether charging, discharging, or dormant. The methods suppress and reverse dendritic growth and control the quality and healing of the SEI, both common sources of reduced performance and eventual failure for most batteries.

In particular, provided herein is a method comprising inducing electric and magnetic fields (field-induced current) across an electrode of a electrochemical cell, such as an anode of a battery. The field and current across the electrode may be referred to herein as a transverse current as this current is typically transverse to the ionic charge current that may be applied when charging a battery. The field and current may be induced from connecting AC energy, e.g., AC current, across the electrode or at a discrete point or points of the electrode.

A potential is induced across a surface of the electrode in the presence of a chemical potential between an electrolyte and the surface of the electrode. The induced potential propagates across and charges the surface of the electrode. This electrode may be a first electrode in any method or device described herein.

Another embodiment involves a charging method comprising, in a battery including a first electrode and a second electrode, applying a direct current (DC) charge current to one of the first electrode and the second electrode. In conjunction with applying the DC charge current, applying alternating current (AC) energy to at least one of the first electrode and the second electrode. The presence of AC energy may suppress dendrite growth, among other advantages discussed herein.

Aspects of the disclosure may further involve a battery charger comprising a power supply including a first conductor and a second conductor, where the power supply is configured to apply a direct current (DC) charge current through the first conductor to one of a first electrode and a second electrode of a battery operably coupled with the battery charger. The power supply may further be configured to apply an alternating current (AC) energy through the second conductor to at least one of the first electrode and the second electrode of the operably coupled battery.

Yet another aspect may involve various possible battery designs that incorporate a patterned layer that affects resonance, and more particularly may affect resonance of the anode and the effect of the AC signal on the anode and the overall effect of suppressing dendrite growth among other advantages. In one example, a battery may comprise a first electrode (e.g., an anode) and an ion transport layer including a first side and a second side, the first side operably coupled with the first electrode. The battery may further include a second electrode operably coupled with the second side of the ion transport layer, and a patterned layer operably coupled with the first electrode where the patterned layer is configured to receive an AC energy distinct from a charge or discharge energy.

Additional embodiments and features are set forth in part in the description that follows, and in part will become apparent to those skilled in the art upon examination of the specification, or may be learned by the practice of the embodiments discussed herein. A further understanding of certain embodiments may be realized by reference to the remaining portions of the specification and the drawings, which forms a part of this disclosure.

BRIEF DESCRIPTION OF THE DRAWINGS

Example embodiments are illustrated in referenced figures of the drawings. It is intended that the embodiments and figures disclosed are to be illustrative rather than limiting.

FIG. 11 depicts the propagation of an electro-magnetic (EM) pulse on an electrode of a coin battery.

Figure 1:
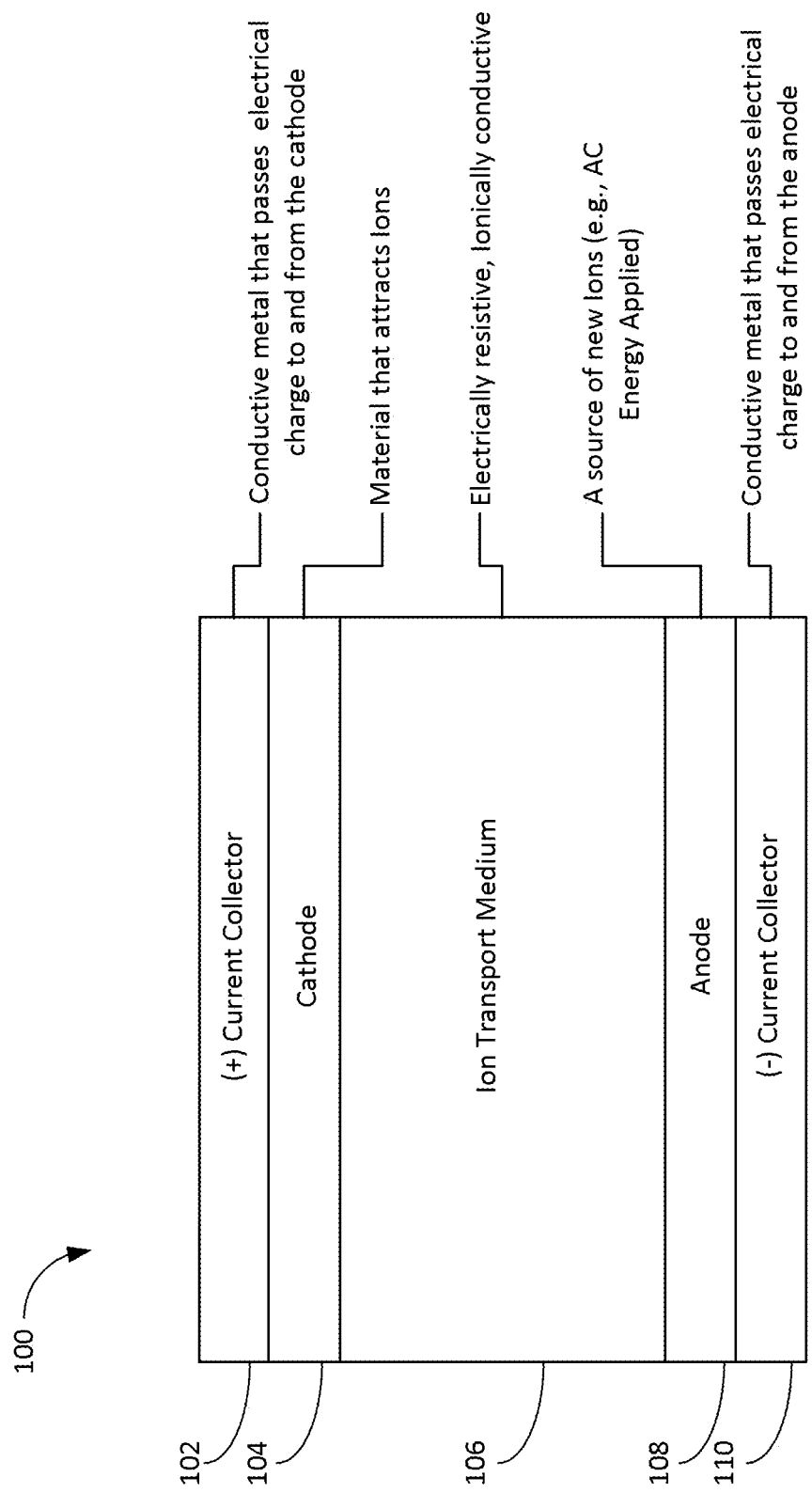
FIG. 1 depicts a cross-section view of the layers of a typical battery cell.

The present disclosure may be understood by reference to the following detailed description, taken with the drawings as described above. It is noted that, for illustrative clarity, certain elements in various drawings may not be drawn to scale, may be represented schematically or conceptually, or otherwise may not correspond exactly to certain physical configurations of embodiments.

DETAILED DESCRIPTION

Provided herein are methods, devices and compositions which electrochemically bond or rearrange metals on surfaces, particularly on an electrode of a battery. Generally, the methods and devices operate by delivering alternating current (AC) energy at the electrode, such as inducing an AC current across a surface of an electrode of a battery cell, the current being approximately transverse to an electrochemical current, such as a DC charge current, carried by ions diffusing between the anode and cathode of the battery. Generally, the electrolyte is adjacent to the surface of the electrode, forming an electrode-electrolyte interface, where metal from the electrolyte contacts the surface of the electrode and passes charge across the interface to create a current during the electrochemical process. By inducing an AC current across the surface of the electrode transverse to the electrochemical current (or otherwise delivering AC energy to the electrode) electrons at the surface experience a forward compression and rearward expansion of their electric field. This compression and expansion generates a relativistic charge propagating outward from the electron's center at the speed of light. The relativistic charge then bends the field lines of the electrochemical current (e.g., the DC charge current), directing metal from ions in the electrolyte or partially adsorbed atoms or particles on the surface to diffuse and form more uniformly along the electrode surface. More particularly, metal ions or surface particles are directed into cracks and crevices, pits and voids, and high-aspect surface features on the electrode. As discussed in more detail below, this leveling effect on the electrode during a charge-discharge cycle of a battery may reduce the growth potential and/or growth size and/or rate of dendrites along the battery electrode and otherwise suppress surface irregularities and roughness that otherwise form in conventional battery electrodes, effectively prolonging the battery's life, improving the performance, and avoiding exothermic events behind overheating, fires, and explosions.

The methods and devices described herein may operate to induce an electric potential across the surface of the battery electrode. The induced potential bends the field lines proximate the surface so metal from the electrolyte follows a path of the bent field lines to deposit the metal onto the surface. In one specific example, the induced potential affects the field lines. These bent field lines ultimately intersect the surface, including irregularities in the surface, at 90 degrees to the portion of the surface being intersected. Viewed another way, the bent field lines of the first current alter the trajectory of the metal from the electrolyte as it deposits onto and is bonded to the surface, so the metal has a lower probability of reaching the overall surface at 90° relative to the electrode's macro-surface on its approach, but rather conforms to the surfaces's micro-level contours and irregularities, and exhibits a leveling behavior on the surface. Thus, the metal from the electrolyte may be directed away from dendrite growths or other irregularities in which dendrite tend to grow. By directing the metal into this "leveling" effect, the electrode of the battery may resist dendrite growth, thereby preventing damage or inoperability of the battery.

The induced potential of the current, and more generally energy, applied at or along the surface of the electrode can be controlled by tuning the AC waveform, including its voltage or amperage and frequency. Multiple waveforms may be combined to tune into different features or substances comprising the surface of the workpiece. In some instances, the extent of dendrite growth or other electrode surface irregularities can be monitored in real-time, so the transverse current can be modulated to direct electrochemical processes on the electrode. The process described herein may improve the formation of the interphase between the electrolyte and the electrode, referred to herein as the Solid Electrolyte Interphase (SEI), by creating a level or uniform SEI layer along the surface of the electrode.

FIG. 1. depicts a a representative section view of the layers of a typical battery, also referred to herein as a battery cell. In general, a battery converts chemical energy to electrical energy. As show in FIG. 1, a battery 100 may include a first current collector layer 102 (sometimes referred to as a cathode current collector), a cathode layer 104, which may be referred to as a cathode alone or in combination with the adjacent current collector layer, an ion transport medium layer 106, which may be an electrolyte, an anode layer 108, and a second current collector 110 (sometimes referred to as a anode current collector) adjacent the anode layer, which may be referred to as an anode alone or in combination with the adjacent current collector layer. During operation, the anode 108 releases ions to the electrolyte 106 that are collected at the cathode 104. The first current collector 102 and the second current collector 110 are typically a conductive metal that passes electrical charge to and from the adjacent anode or cathode. Many different types of battery structures exist (including batteries with different electrolyte materials for the anode 108 side of the battery and the cathode 104 side of the battery), but the general operation described herein applies.

Batteries are often categorized by the materials that makes up the anode or the ion transport layer 106 of the battery 100. For example, lithium batteries have a lithium based anode 108 and ion transport layer 106, such as lithium-metal batteries (Lit containing electrolyte or similar with a lithium foil anode) and lithium-ion batteries (Lit containing electrolyte or similar with Li+ containing graphite anode). Other types of batteries are relevant, including zinc batteries and lead acid batteries, which are known to those of ordinary skill in the art. Although this discussion exemplifies lithium-ion batteries (lithium-intercalated into graphite), the methods disclosed herein also apply to other battery types, including lithium metal, lithium silicon, zinc and lead acid batteries.

When organic electrolyte is used, both types of lithium batteries (among other battery types including Li-Silicon) form a solid electrolyte interphase at the interface of the anode 108 and electrolyte 106 as the lithium chemically reacts with the electrolyte. The interphase is a layer comprising the insoluble inorganic and partially soluble organic reaction products which collect at the interface. This layer may be referred to herein as the SEI layer, discussed above. In general, Li ions pass through the interphase or SEI from the anode 108. Because the interphase generally has a higher impedance, non-uniformity of the solid electrolyte interphase across the anode 108 can cause uneven current distribution across the anode. This unevenness encourages channels to form through the interphase where Li concentration is high. These channels lead to the formation of dendrites. In other instances, irregularities along the surface of the anode 108 may also encourage dendrite growth.

More particularly, dendrites typically grow during charge cycles of a battery as lithium plates/deposits onto the anode surface 108. Electrodeposition proceeds across the interface of two phases via a charge-exchange mechanism between a polarized surface and oppositely charged ions dissolved or suspended in electrolyte. The mechanism is usually comprised of multiple steps wherein an ion may undergo a partial or full charge exchange, and may diffuse across the surface partially adsorbed before settling. Growth mechanisms can be distinguished as 2D (layer by layer type) or 3D (nucleation-coalescence). The prevalence of either mechanism depends upon the initial condition of the electrochemically active surface, the overpotential of the driving voltage relative to the thermodynamic energy barriers of each, and the properties of the electrolyte.

Though no two metals exhibit identical material properties and growth behavior during electrodeposition, most electrodeposits tend toward rough structure and morphology with increasing thickness. Putting aside the impact of electrolyte chemistry, low surface energy crystal faces tend to grow faster over time. As one crystal face starts to dominate, the grain structure of a deposited layer may change from small and randomized to columnar in nature. This is true for the deposition of both copper and lithium, though the two have significantly different elastic and reactive properties that impact their relative morphologies in a battery cell.

Figure 2A:
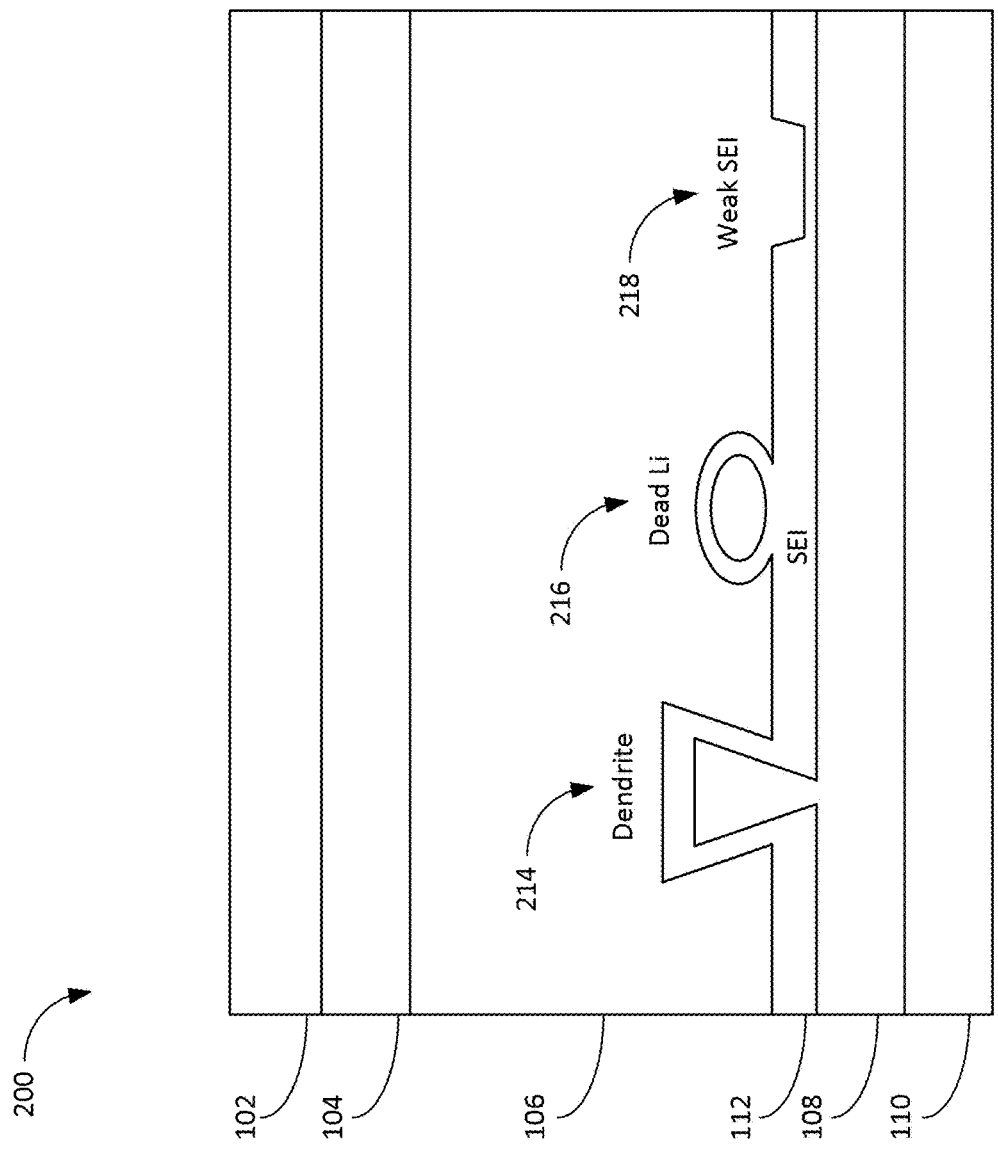
FIG. 2A depicts a cross-section view of the layers of the typical battery cell with common problems illustrated for lithium metal batteries.
Figure 2B:
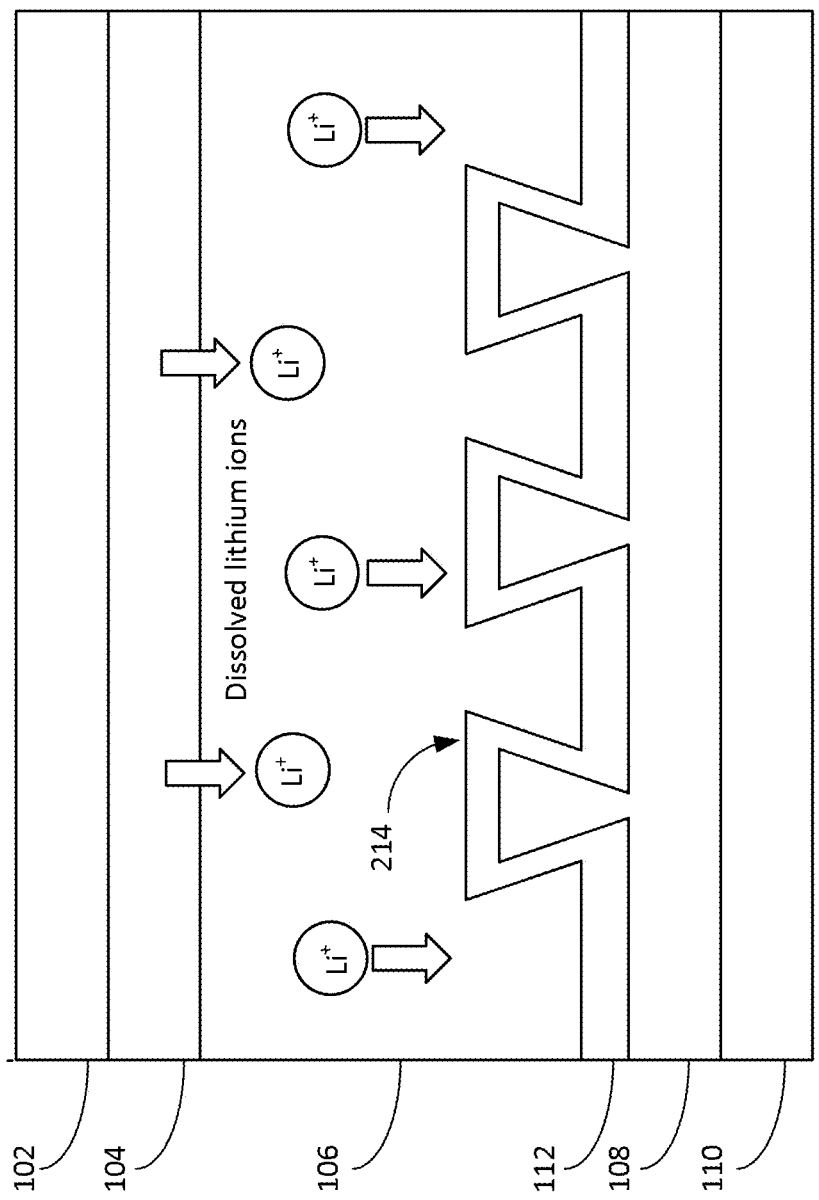
FIG. 2B depicts dendrite growth in a battery cell during charging.

FIGS. 2A and 2B illustrate common problems that may occur on a surface of an electrode of a battery 200. The battery of FIG. 2A includes the same layers as the battery described above with relation to FIG. 1, such as a first current collector layer 102, a cathode layer 104, an ion transport medium layer 106 or electrolyte, an anode layer 108, and a second current collector 110. The figure also shows a solid electrolyte interphase 112. As shown in the diagram 200, a dendrite 214 has grown from the anode 108 of the battery 200 through multiple charge cycles of the battery. FIG. 2B illustrates the problem caused to the effectiveness of the battery 200 from the growth of dendrites 214. In particular, dendrite growth occurs on the anode 108 during charging of the battery. These dendrites begin to block the lithium ions from reaching other areas on the surface of the electrode, thereby preventing them from participating in the reaction. These ions may also form other dendrites, further increasing the ineffectiveness of the battery. Limiting the growth of dendrites on the electrodes of the battery 200 may thus improve the operation and life of the battery.

Figure 2C:
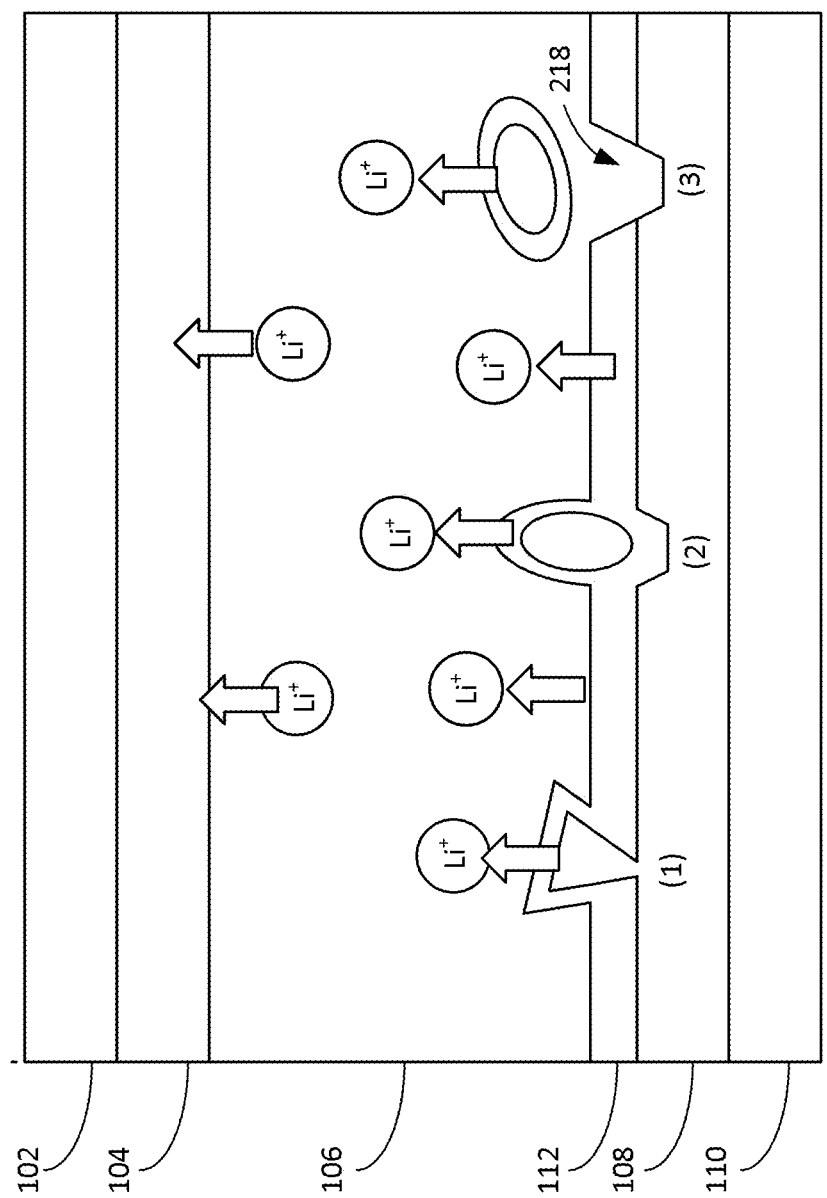
FIG. 2C depicts damage to a solid electrolyte interphase layer of a battery during discharge of the battery.

Another issue in a battery through a charge cycle is the creation of an irregularity in the SEI 112, causing a weak spot 218 in the SEI layer 12 between the electrolyte 106 and the anode layer 108, which issue is also illustrated in FIG. 2C. During discharge of the battery, the dendrites that have formed on the electrode 108 may be partially dissolved back into the electrolyte layer 106. However, the dendrites do not dissolve uniformly and the connection with the anode base 108 may weaken. The remains of the partially dissolved lithium may lose electrical contact with the surface and no longer participate in the reaction. This may leave a weak, thin area in the SEI layer 112 and/or the anode surface. The SEI 112 be able to immediately reform in the damaged area, causing an irregularity 218 in the surface.

Returning to FIG. 2A, another common problem that arises through a charge-discharge cycle of a battery 200 are non-conductive metal deposits 216 (sometimes known as dead lithium 216 or other inert collections of metal) in the electrolyte 106. In some instances, rough features may form along the surface of the electrode 108 that are fragile, such as mossy and fractal lithium. These growths may eventually break from the surface 108 and lose electrical contact. As a result, the energy potential of this metal mass is no longer available for power storage and battery capacity is permanently lost. Each of these issues may be addressed through the application of an AC energy signal at or along the electrode 108.

Conventional techniques to prevent rough deposits have included chemical additives, known as brighteners and levelers, which are often used in the surface finishing industry for electrodeposition and electroplating. Pulse plating and modulated signal techniques offer improvements and control over electrodeposition that are better theoretically predicted and more easily transportable from one metal chemistry to the next. However, the benefit of these approaches to a lithium system, where reaction rate and diffusion layer thickness are heavily dependent upon an SEI layer, is less clearly defined. For example, a pulse may cause an electrode to temporarily reverse its polarity (Reverse Pulse Plating) so as to periodically re-dissolve rough edges that may be forming before they grow significantly. However, when applied to a battery, the pulse may disrupt the battery's output power.

These issues may be more prevalent in certain types of batteries than in others. For example, pure lithium metal batteries have a much higher (~5-10×) energy capacity compared to lithium ion, but there is little known in the art of how to control dendrite growth. The primary obstacle preventing commercial adoption of lithium metal batteries is the inability to routinely electrodeposit lithium onto the anode without destructive and dangerous dendritic growth, which also leads to electrolyte consumption, low Coulombic efficiency, and eventual cell failure. It is especially challenging to identify potential solutions that do not compromise the capacity or operating voltage of the battery, and that are applicable over the entire range of form factors now required across industries and products. Currently, these batteries typically last only through ten charge-discharge cycles. Failure is often instantaneous and severe when compared to common lithium-ion batteries.

In addition, as batteries become smaller with increased power capacity these issues have been amplified and pose significant design constraints. The lifetime and performance of batteries based upon lithium or any other chemistry may be greatly prolonged by increasing the smoothness and uniformity of electrode surfaces using the techniques and apparatus of the present disclosure. This could also allow for increasing the rate of recharge without compromising the lifetime of the battery as with conventional batteries.

Described herein are methods and devices for controlling dendrite growth on electrodes and reabsorbing growths into the electrolyte in batteries, improving the performance and life of the battery. In some embodiments, the methods and devices may be operated during DC charging of the battery to stymie or lessen the formation of dendrites on electrodes of the battery. Additionally, the methods may be executed during other operational states of the battery to provide additional benefits to the life and performance of the battery, such as leveling an interphase layer of the battery or dissolving growths into an electrolyte layer. Controlling or lessening the growth of dendrites in the battery may also result in a relatively more durable battery. In general, through the application of an AC signal at or across an electrode of the battery, a uniform time-averaged current distribution across the entire surface may be maintained as compared to conventional techniques without such alternating energy forms to the electrode (e.g., anode), to more evenly distribute concentrations of lithium ions or other charge transfer species throughout the solid electrolyte interphase to maintain an anode/electrolyte interface with uniform electrical behavior.

Method

Figure 3A:
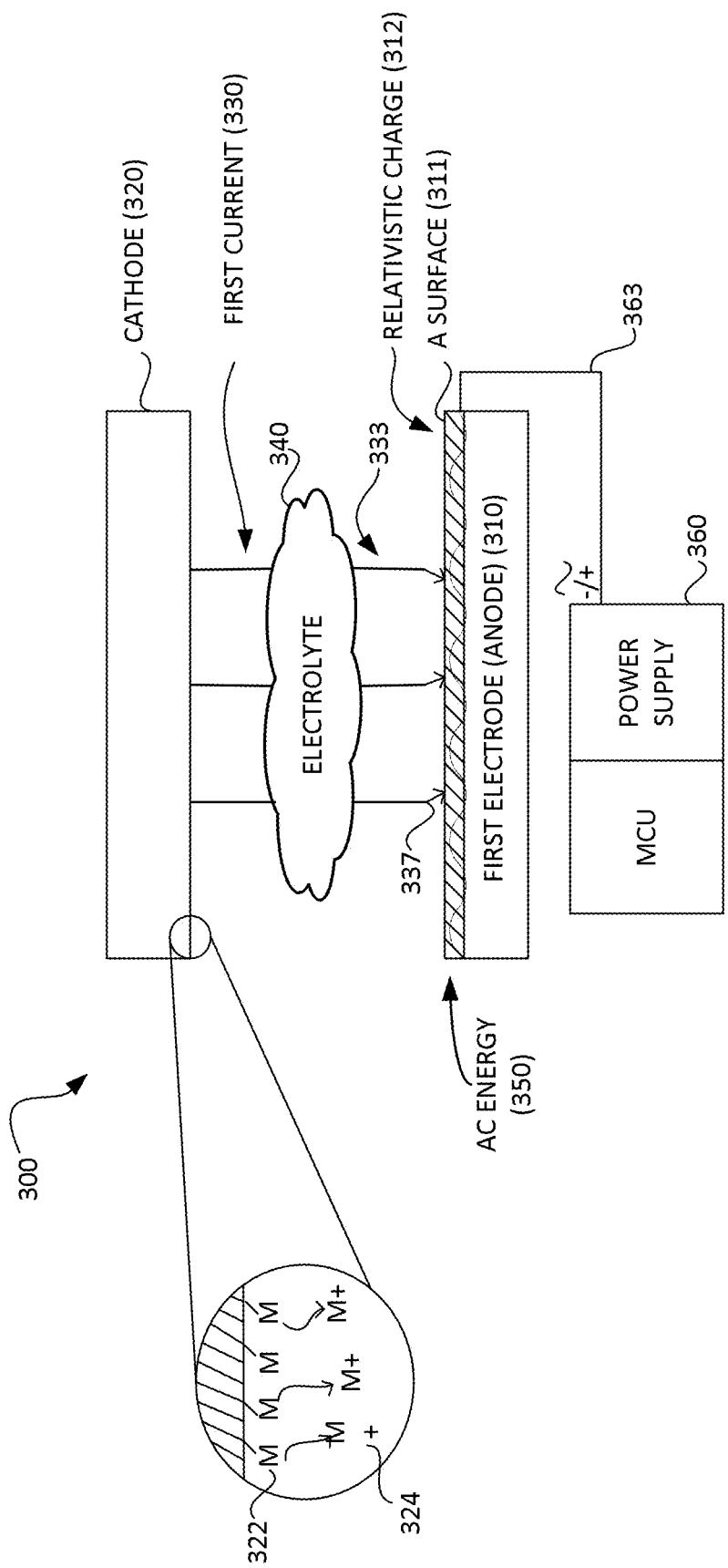
FIGS. 3A-3B depict a first power supply and a second power supply, respectively, for introducing an electrical waveform across a surface of a first electrode of a battery cell.
Figure 3B:
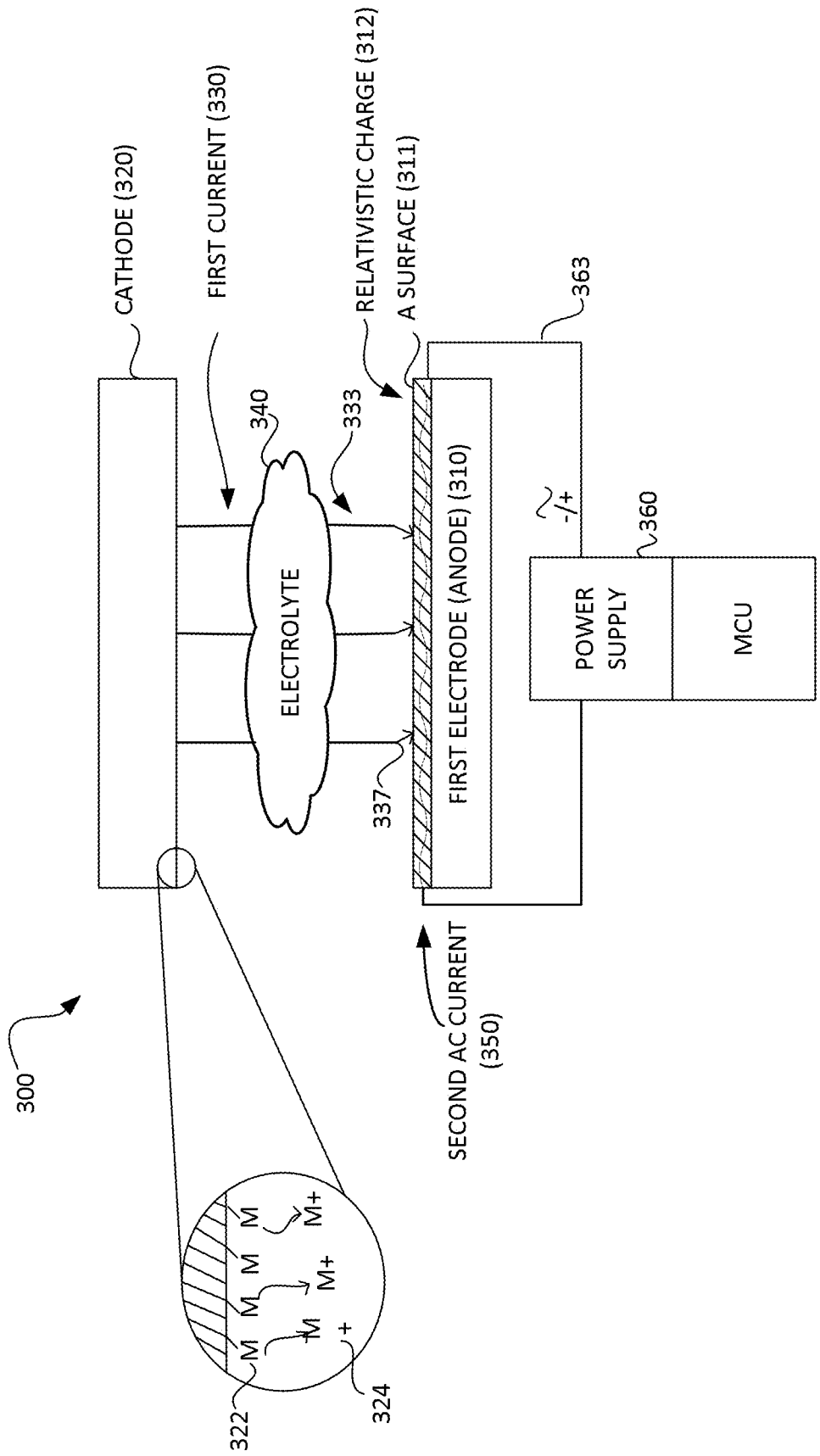
Figure 4:
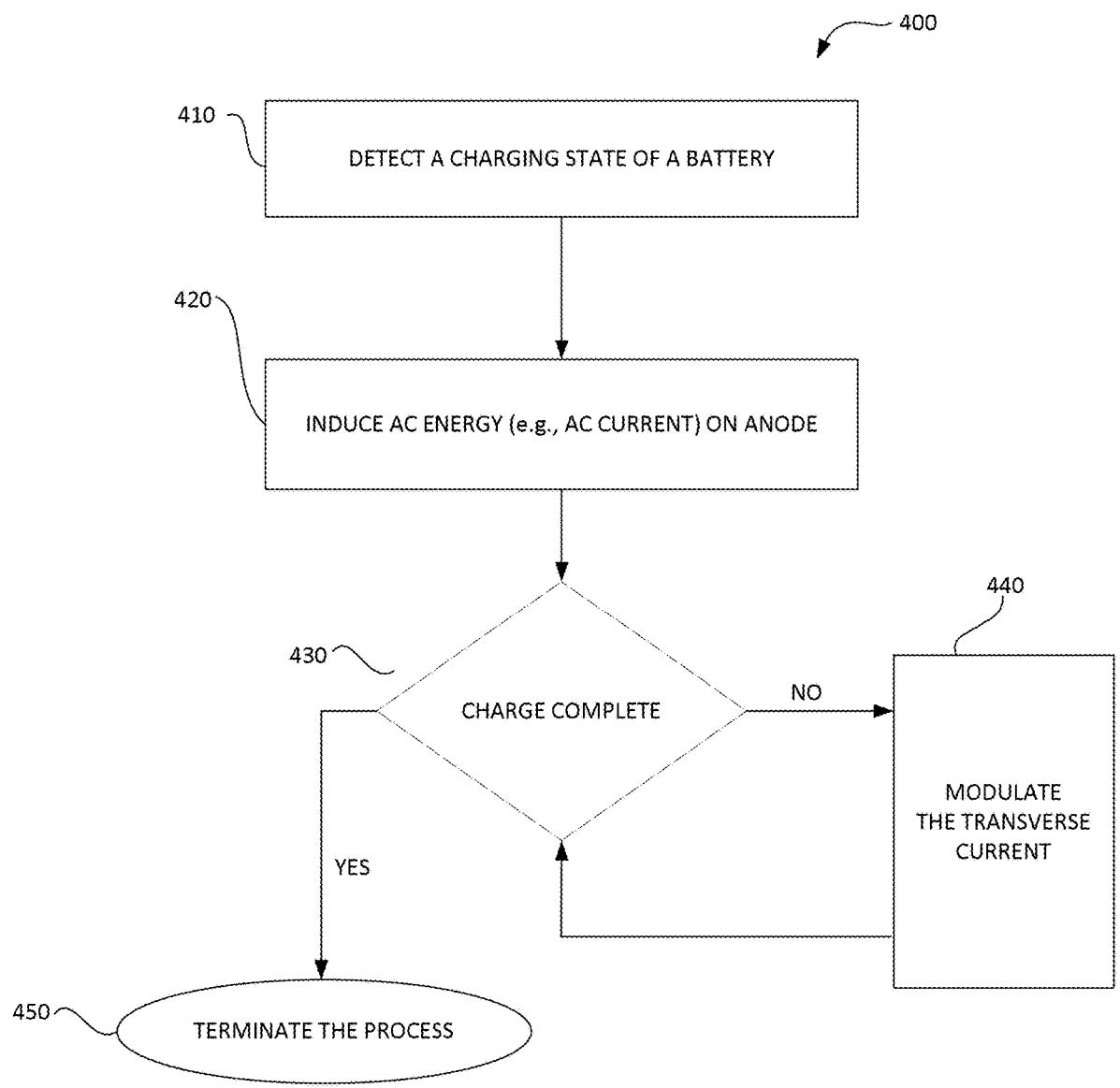
FIG. 4 is a flowchart of the methods described.

In view of the preceding introduction, as well as issues and limitations relative to conventional processes, provided herein are electrochemical apparatus and methods for controlling the deposition process on an electrode of a battery through electrical mitigation or other electrokinetic effects of surface features (e.g., dendrites) of the electrode. FIGS. 3A and 3B illustrate example devices for practicing the method discussed herein and FIG. 4 illustrates an example method according to the present disclosure. In particular, the method 400 of FIG. 4 may be executed during a charging cycle of a battery to suppress or reduce dendrite growth on a surface of an electrode of the battery. Referring to FIGS. 3A, 3B and 4, a system 300 may determine when a battery is in a charging operation state (410). When a battery charger is connected, it may or may not be charging, and depending on state of charge or other factors, the level of charging may be more or less. For example, during later phases of charging, nearing 100% state of charge, charge current may be reduced. Similarly, current draw from a battery may be more or less depending on a load on the battery. During a charge cycle of the battery, a current may be induced across the anode (420), which may be an alternating or non-DC current across the surface of the electrode. During lesser charge levels or lesser discharge levels, relatively greater AC energy may be applied and hence the induced AC energy may be dependent on charge (or discharge state). As discussed herein, AC energy levels may further be a function of physical and material properties of the particular battery system. If the charge cycle process is incomplete (430), the transverse current along the electrode may be modulated (440) to adjust the applied AC energy to the anode. So, for example, AC energy application may be adjusted based on state of charge, temperature, impedance measurements, and other feedback mechanisms. If the charge cycle process is complete, the process terminates (450). In some instances, AC energy may continue as reabsorption of orphan lithium or other materials may be reabsorbed into the anode (or cathode) as the case may be.

Referring in more detail to FIGS. 3A and 3B, a battery environment 300 is illustrated. In particular, the environment 300 includes a cathode 320 electrode, an anode 310 electrode, and an electrolyte 340 adjacent the cathode and anode. During charging of the battery, ions 324 included in the electrolyte 340 are collected at the anode 310. Further, through the method described, a power supply 360 may be in electrical communication 363 to at least a single contact point on the anode 310 (FIG. 3A) or more than one point of the electrode FIG. 3B. The power supply 360 may thus provide an AC energy signal or wave 350 at and/or across surface 311 of the anode 310 through the contact point or points on the anode. A single point of contact can create a wave across the surface, particularly when the current has a path such as being absorbed by the electrolyte. This applied AC energy, which may be an AC current 350, is induced across the first electrode 310, which makes it transverse to a first (charge) current 330 between the cathode and anode. The second current 350 induces a relativistic charge 312 in and/or across a surface 311 of the first electrode 310. In some embodiments, the device includes a power supply 161 in electrical communication 161 with the source for a countercharge 120 and in electrical communication 162, 163 with the first electrode 110. The power supply, which may involve more than one device depending on the implementation, may provide and control the first current 130 and the second current 150.

More particularly, the transverse current 350 can be applied at, through and/or across the surface 311 of the first electrode 310 to affect surface electrons and induce favorable properties in the deposit without altering the design parameters of the electrolyte 340. In the presence of the AC energy at the electrode, the electrons at the surface 311 experience a forward compression and rearward expansion of their electric field. This compression and expansion generates a relativistic charge 312 propagating outward from the electron's center at the speed of light. The relativistic charge then bends the field lines, conventionally not bent during charge, of the electrical/chemical reaction, directing metal from the electrolyte to form on the electrode in a controlled fashion with surface roughness suppressed. Viewed in another way, the induced potential bends the field lines proximate the surface so metal from the electrolyte follows a path of the bent field lines to deposit the metal onto the surface. The bent field lines ultimately intersect the surface, including irregularities in the surface, at 90 degrees within close proximity to the portion of the surface being intersected. The difference between a point of deposition under the induced potential and a point of deposition without the induced potential is a shift of the field lines toward crevices and rough areas of the surface not normally filled. The AC energy to the anode can augment many aspects of the electrodeposition processes that occur in a battery during a charge/discharge cycle, including, but not limited to, two-dimensional growth (smoothness and uniformity); grain properties, such as crystallinity and morphology; induced nucleation on energetically difficult surfaces; reduced porosity in the metal; adhesion onto the substrate; and controlled linear crystalline growth.

This change in the electron distribution then alters the behavior of metal atoms approaching the surface. Conventionally, the charge density is greater around irregularities of the workpiece, which then promote layers of metal to build up the irregularities even more. Instead, in the disclosed method, atoms are encouraged to follow a path to generate a smooth surface, because areas that would have a large charge density absent the transverse current have a lower than typical charge density, and areas with a small charge density absent the transverse current have a greater than typical charge density. The frequency of the transverse current's waveform can be swept through several values so irregularities of many sizes may be modulated. In one particular embodiment, the frequency of the transverse current waveform may range from 100 Hz to 300 GHz.

Device

The present disclosure also provides a device for performing the methods described herein. In particular, a device may be utilized for providing an AC signal to an anode of a battery cell. The signal may be applied through a single point of contact with the electrode 310 or through two points of contact. The device may include a current generation source, such as power supply 360, to induce a current 350 along the electrode surface as described in the example methods contained herein. In some embodiments, a main control unit (MCU) 363 may be included to control the current source.

The power supply may include the MCU or otherwise be associated with the same, and the MCU may include a processor or other compute components in communication with a memory or other tangible storage medium including software forming executable instructions or control sequences to perform various methods discussed herein, a computer-controlled power modulator, and auxiliary electronics. In the main control unit, the processor is configured to execute the instructions stored on the computer readable medium. The power modulator and the power supply may be controlled by the MCU. The MCU may include one or more additional electrical components for providing any signal to the battery electrode. The charge current and AC energy connection point to the electrode may be shared, in some embodiments.

In still other embodiments, the system may utilize an existing charging circuit in electrical communication to provide the AC energy signal to the electrode of the battery. For example, a power supply (charging supply) of a personal computing device (such as a cell phone, laptop, or other mobile computing device that may run off battery) may be modified to provide the AC energy signal to the anode of a battery included in the device. In another example, a battery management system (BMS) of a vehicle may be modified to transmit currents to the electrodes of a battery or discreet batteries of a larger pack to achieve the methods described herein. In embodiments discussed herein, conventional charge devices may be modified with appropriate control schemes to provide conventional DC charge with the addition of an AC signal applied at the anode. For example, in addition to conventional charge electronics, plugs, conductors and the like, a conductor may provide a path between the anode a power supply portion of the charger, and the power supply configured to provide the AC signal to the anode under control of the MCU.

Dendrite Mitigation

The methods described herein control various possible forms of uneven, rough, and/or non-optimal surface effects including dendrite growth and dendrite precursor growth on an electrode or electrodes in many types of electrochemical structures such as batteries including, but not limited to, lithium metal batteries, lithium-ion batteries, lithium silicone, zinc batteries, lead acid batteries, and the like. The method may be executed on an electrode of a battery to provide multiple electrodynamic effects, including suppressing growths of dendrite on the electrode of the battery.

The method, in particular embodiments, involves generating tailored waveforms and applying those waveforms to the electrode, which may be in combination with a charge current, in order to excite in the surface at frequencies correlating to specific resonances of the electrode or desirable patterns of induced current density. Independent of its application environment, a real world conductive surface is prone to a particular charge distribution based on geometry and intrinsic properties. Resistive losses attenuate the power across the surface. Current density is larger at curved or sharp points and electric field potential lines ultimately approach the surface orthogonally. For these reasons, independent of electrolyte, a polarized electrode experiences an uneven charge distribution absent the techniques set out herein.

During conventional electrodeposition that occurs during charging a battery, for example, electrons are uniformly dispersed tangentially to the electrode surface due to mutual repulsion of their electric fields. But tangential points may not be parallel and curved features appear to allow electrons to bunch together. Such an area can attract more metal ions and evolve dendrites. By using AC energy to shift these charges from a high energy area to an adjacent area for a statistically significant period of time, the native charge distribution of the electrode can be altered along with the overall deposition pattern.

As the wavelength of the AC ($\lambda_{AC}$) decreases in size and approaches the length-scale of the electrode, or those of a feature on the electrode, the energy changes from capacitive to inductive in nature. That is, with an electrode length-scale $<<\lambda_{AC}$, there will be a potential gradient across the surface from one end to another. The magnitude of that gradient is greatest when each electrode end is spatially matched to the maximum and minimum of the waveform ($\sim\lambda_{AC}$). When the electrode length-scale $>>\lambda_{AC}$, many points of maxima and minima will exist leading to a higher occurrence of inductive energy at the surface. This phenomena may affect adsorption, surface and bulk diffusion, and nucleation processes even though the frequencies are much faster than the characteristic times of those processes.

Contrary to conventional pulse or modulation techniques at lower frequencies, high frequency AC is subject to continuous superposition of incident and reflected energy throughout the system that will interact constructively or destructively at different points along the surface. For this reason, it is not necessarily the applied transient waveform that must be considered, but rather the resulting standing wave pattern. Frequencies above ~200 MHz saturate and exceed relaxation times of most electrolytes despite negligible contributions from ions moving without an ionic cloud (known as the Wien Effect). Lack of high frequency ionic conductivity through the electrolyte causes the anode and cathode to be considered, and potentially modified, independently.

The electrolyte will modify the electrode's native electrical behavior at the interface in predictable ways. The electrolyte will absorb a portion of the AC energy due to its conductivity, attenuating the signal over distance. This may be overcome by selecting a waveform and frequency whose incident and reflected energy combine constructively some distance from the point of application of the signal on the electrode. For example, the incident energy may constructively combine with the reflected energy to provide areas along the surface of the electrode where a high energy signal is present. Further, the permittivity of the electrolyte will determine a degree of dielectric contraction of the waveform.

The amplitude of the waveform presents a possible control parameter of the effects of the AC energy on the electrode. For example, control of AC energy frequency or amplitude may be utilized to tune the AC energy waveform applied to the electrode. A resulting standing wave may be used to cause a rough area of the electrode to stay below a thermodynamic potential boundary, or a smooth area to exceed it. Similarly, current density may be focused away from a particularly rough area to prevent additional dendrite growth in that area. Through an analysis of the condition of the electrode surface, the peaks and troughs of the applied AC energy wave may be determined to select which portions of the electrode surface have a higher or lower current density. Under conditions where the frequency and amplitude are great enough, the potential difference between adjacent areas of the surface of the electrode may induce localized galvanic reactions, with or without a counter-electrode. The implications of this phenomena for dissolving dendrites and homogenizing the SEI layer in a lithium based battery is clear.

Low frequency AC power exhibits DC-like behavior relative to the electrode. As the AC increases in frequency the power focuses closer to the surface according to the skin effect. In an ideal conductor expected skin depths are 2 mm at 1 kHz, 2 µm at 1 GHz, and so forth. That is, most of the AC power is focused into a much thinner subsection of the surface of the anode at higher frequencies. When the interface is more complex, such as when the thickness of roughness and the skin depth are similar, most of the AC power can then be said to reside at the interface. Consequently, the efficiency of the AC power is related to the applied frequency and less power may be necessary at higher frequencies.

Figure 5:
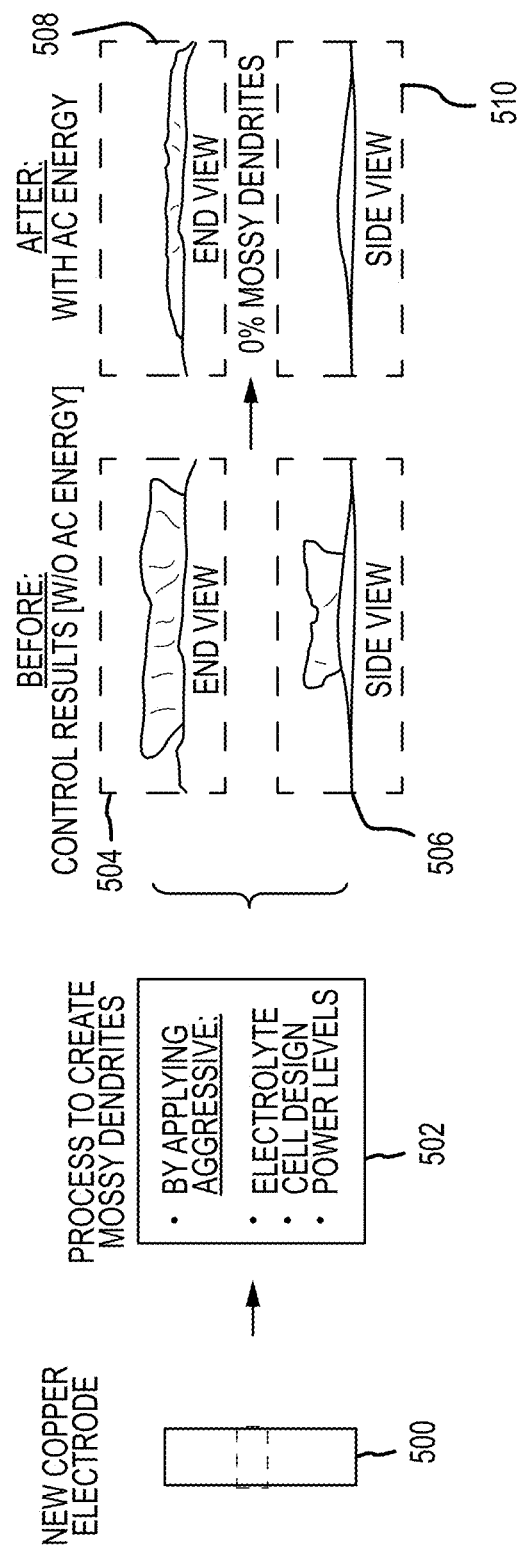
FIG. 5 depicts a comparison of plating on a copper electrode with and without transverse current, showing suppression of dendrite growth through the application of the method of FIG. 4.

Several experiments were completed utilizing copper electrodeposition as an analogue for lithium metal on an electrode of a battery. The tests demonstrated initial feasibility to dramatically suppress formation of dendrites in an aggressive test environment designed to generate mossy dendrites. Control tests to generate dendrites were run on copper electrodes 500 using fully saturated electrolyte solution of cupric sulfate in deionized water. Additives or other methods to reduce dendrites or roughness were intentionally excluded. Charge current densities for the control were ~65 mA/cm2. In more detail, FIG. 5 illustrates a snapshot of a control sample 500 with greater than 60% surface coverage of mossy dendrites compared to the same test conditions run with an AC signal applied across the electrode. As shown, the sample was run with the noted charge current density and without AC energy (end view of sample 504 and side view of sample 506) and with AC energy (end view 508 and side view 510) with an aggressive electrolyte (low purity, reagent grade, saturated copper sulfate), oxygen containing copper counter-electrodes, excessive current densities (65 mA/cm^2), unsymmetrical cell (surface area of counter-electrodes >working electrode), and long deposition times (8 hrs) (process 502). The approach, as shown in views 508 and 510, eliminated large amounts of the mossy dendrite surface coverage as compared to the approach without AC energy (views 504 and 506).

Figure 6:
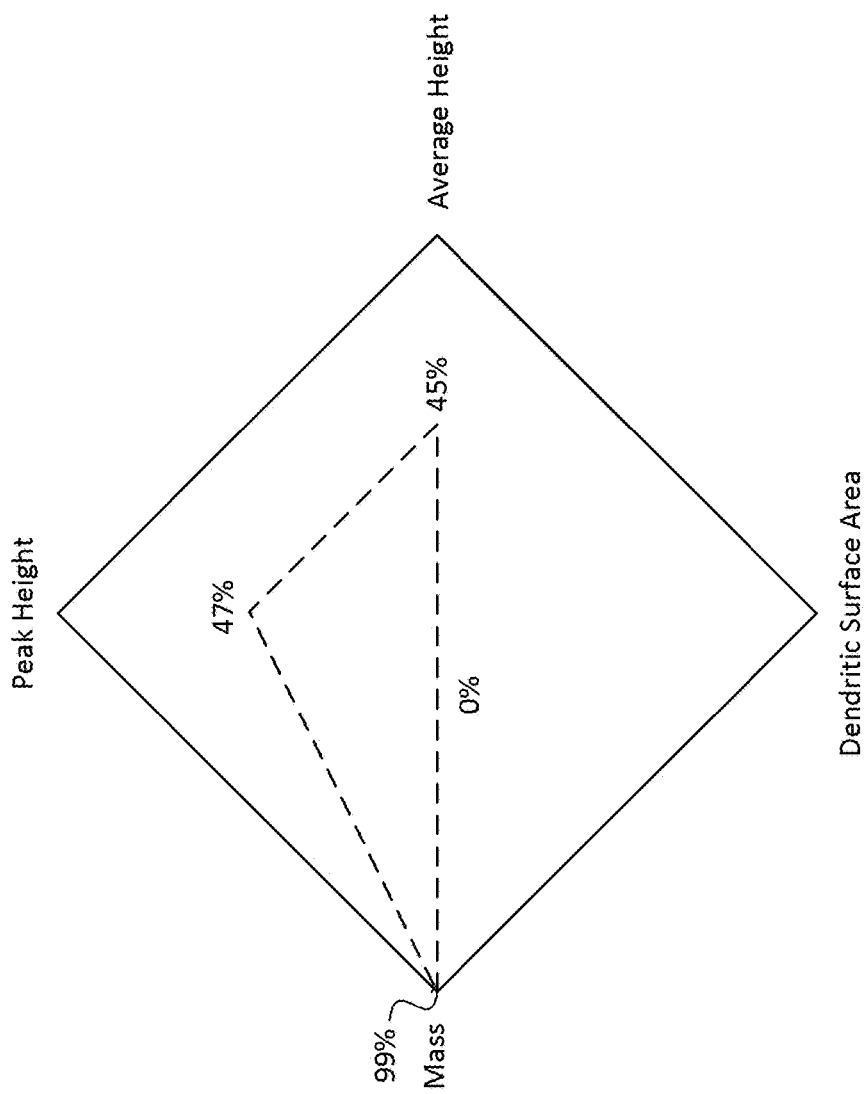
FIG. 6 depicts a comparison of a control sample and an experimental sample of dendrite growth through the application of the method of FIG. 4 on a copper electrode.

In particular, FIGS. 5 and 6 (as well as FIGS. 7 and 8) show results from the application of an AC signal with a frequency of 75 kHz and a power of 23 dBm to the electrode 500.

Figure 7:
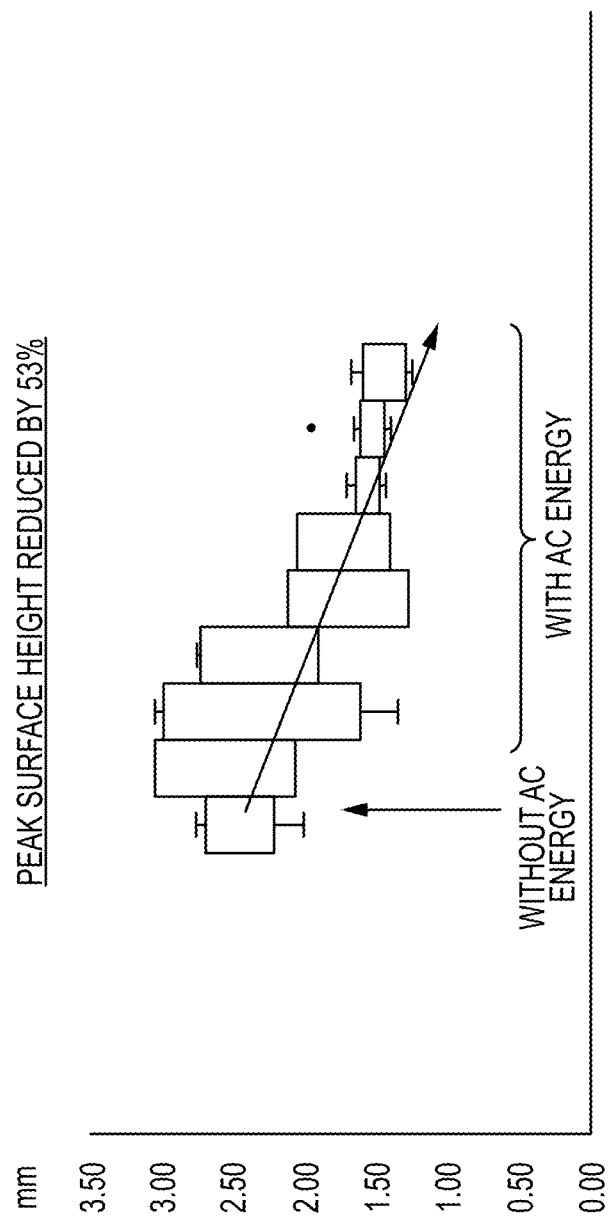
FIG. 7 depicts a comparison of dendrite peak height of a control sample and peak heights of various experimental samples with different frequencies of transverse current following the application of the method of FIG. 4 on a copper electrode.
Figure 8:
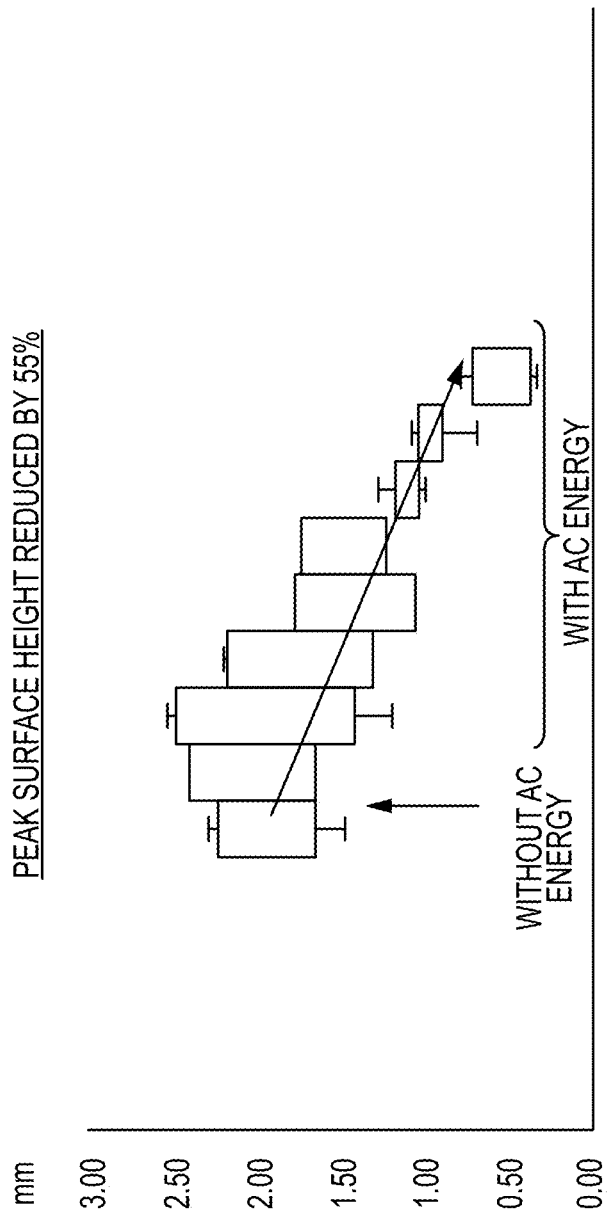
FIG. 8 depicts a comparison of average height of dendrites on a control sample and average heights of experimental samples with different frequencies of transverse current following the application of the method of FIG. 4 on an electrode of a battery.

To execute the experiments related to FIGS. 5 and 6, a DC power supply and an AC power generator were employed. The signal from the AC generator and the DC negatively polarized power were both connected independently to a T-junction. A wire ran from this junction to the test cell. The DC positive polarization is connected directly to the counter electrodes of the test cell. The AC generator line contained a DC filter inline and upstream of the T to block DC current from flowing into the signal generator. Similarly, the DC power supply includes an AC filter inline and upstream of the T to block AC energy from flowing into the power supply and disrupting DC current and voltage measurements. Such a configuration may be employed, generally speaking, in a battery charger. The results illustrate dramatic reductions in mossy dendrite surface coverage while achieving desired performance on deposited mass relative to control results. In addition to virtual elimination of mossy dendrite surface area, peak and average surface height in the area of deposition was reduced by >50% as shown in FIG. 7 and FIG. 8, respectively. In FIGS. 7 and 8, each block (relative to the respective controls) illustrates variability within the respective data set represented by a respective block, with each diagram illustrating respective trends of decreasing dendrite height for each data set relative to the respective control of each Figure.

Figure 13:
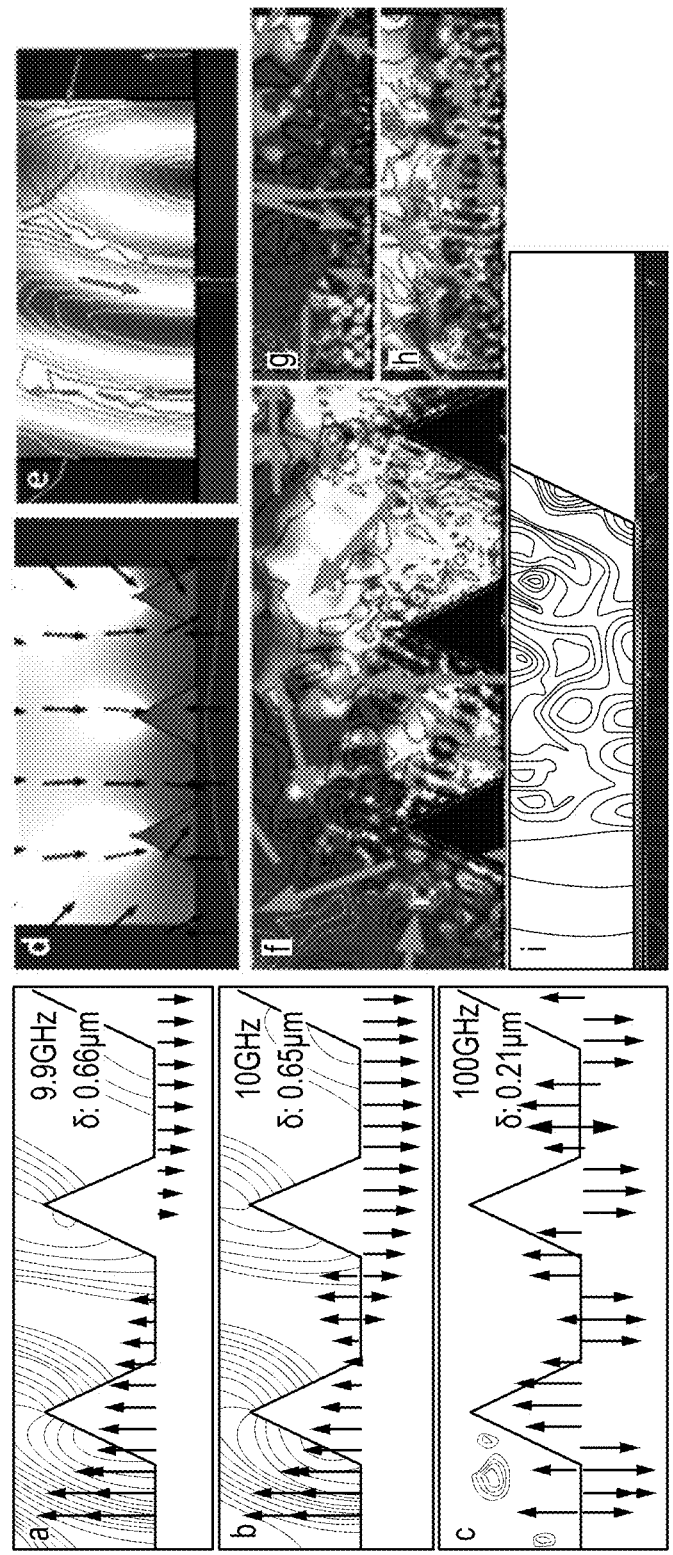
FIG. 13 depicts simulation results applying an electric waveform along an electrode of a battery.

FIG. 13 depicts simulation results applying an electric waveform along an electrode of a battery. In particular, the simulation results sections (a)-(i) of FIG. 13 were generated through a simulation of a conductive electrode in aqueous conditions ($\rho=1.68$ E-8 $\Omega$m, $\pi_{soln}=5$ S/m, $\varepsilon=80$) or Lithium battery/organic electrolyte conditions ($\rho_{Li}=9.28$ E-8 $\Omega$m, $\sigma_{soln}=1$ S/m, $\varepsilon=45$) materials. An AC energy signal was applied along the surface of the electrode in a manner similar to the methods described herein. A conductive electrode is a foil conductor that is 6 mm wide, 35 μm thick w/w/o 1 mm triangular roughness. A cross-section view of the conductor is illustrated best in section (d) that illustrates the triangular roughness of the surface of the foil conductor.

Sections (a)-(c) illustrate various AC energy signals applied to the conductor during simulation. In particular, section (a) illustrates a 9.9 GHz AC energy signal, section (b) illustrates a 10 GHz AC energy signal, and (c) illustrates a 100 GHz AC energy signal. Further, electric field (arrows), magnetic field (contour lines), and current density are also illustrated for each signal showing the skin depth ($\delta$) in aqueous conditions.

Section (d) illustrates a current density profile (gray scale) due to a DC signal (approximating the charging current on the electrode) and the roughness of the surface. Thus, section (d) illustrates the case where no AC signal is applied along the surface of the electrode. Rather, only the DC charge current is applied to the electrode. As can be seen, the current density in this case is collected around the points of the triangular roughness portions of the electrode. It is at this points that dendrite growth is likely to continue. Stated differently, there are three areas of higher current density at the tips of each triangular roughness, causing more current to flow at those areas, and faster growth at those areas as a result.

In contrast, section (e) illustrates a current density profile (grayscale) from the application of an AC signal along the surface of a smooth conductor. As can be seen, the electric field and current density can be artificially manipulated by applying an AC energy signal to the electrode. So, for example, using the system and method discussed herein, the points of high density of a conventional system (e.g, (d)) may be distributed away from the peaks reducing or eliminating dendrite growth. Further manipulation of the parameters of characteristics of the AC signal may tune the current densities as desired. In section (e) (AC power), there is no triangular roughness (e.g., like in (d) but instead the surface is flat. Despite that fact, using AC energy, the system and method induce three distinct areas of higher current density indicated by the U-shaped lines from the flat surface, which lines show the magnetic field behavior. By manipulating frequency and power of the AC energy, the system can change the spatial location of these lines and of higher current density (and faster rate of deposition) across the electrode.

Sections (f)-(h) illustrate a time-averaged behavior with an applied AC signal of 100 GHz. High frequency can induce significant transient electric and magnetic field effects despite being much faster than characteristic times of charge transfer and convective processes (~0.1 ms-10 s) (section (f)). High conductivity and permittivity of aqueous conditions (section (g)) add difficulty to uniform current distribution using a fixed frequency. In (f)-(h), the arrows represent the vector of the electric field and the contour lines represent the intensity of the magnetic field, in the presence of the AC signal. More realistic conditions for a Lithium battery (Li metal or Li ion) (h) allow more uniform energy distribution, and therefore, lower required AC power. These conditions are a promising indicator that, even at high RF, AC energy should be largely confined to the electrode and electrolyte interface, imparting a homogenizing effect across the SEI, disrupting dominant ion channels and helping it evolve more rapidly and uniformly in response to the stresses from expansion or contraction of the interface. High frequencies that affect capacitive and inductive coupling of the surface to conductive objects not in direct contact will provide a means of dissolving and reclaiming dead lithium, regardless of the operational state of the battery.

Without AC energy, (f) would look exactly like (d), which shows higher current density at the tips of the roughness and electric field arrows that primarily point straight down toward the electrode, except near rough triangles which cause the field lines to bend. In (f), AC energy causes dramatic bending of the electric field arrows, as well as randomization of the current density in the electrolyte above the roughness. In this case, the roughest areas are no longer growing faster than flatter areas of the electrode. In (g) and (h) with AC energy, everything is identical except that in (g) the electrode and electrolyte have the dielectric properties of a water-based chemistry, whereas (h) has the dielectric properties of a lithium ion battery with organic electrolyte. In (g), the pattern and colorization across the surface is much less uniform than in (h), which indicates that the AC energy will be more uniformly distributed across a lithium battery electrode than the water-based copper experiment.

Section (i) illustrates a magnification of a current skin depth, as well as lateral current distribution at a fixed frequency. Areas of different gray scale show how current density is spatially distributed as a function of frequency. As can be seen in the section, current density along the surface of the electrode represented by variations in light and dark gray is altered through the application of the AC energy signal.

Lithium Ion Intercalation

In addition to dendrite control and mitigation, the application of a transverse AC energy/current at the surface of an electrode may provide further benefits to the operation and maintenance of a battery. For example, during charging of a lithium ion battery, lithium intercalation/diffusion within the graphite is a rate-determining step. Fast charging at the cell's voltage limit leads to potentially excessive concentration polarization. Continuous operation under such conditions may cause a thickening of the SEI layer leading to increased system resistance. It may also cause lithium to begin plating onto the graphite. This rapidly leads to the same problems encountered in lithium metal batteries, beginning with formation of lithium dendrites.

AC energy and transverse current (applied via transmission or conductively direct to the anode) may be used to excite lithium ions and increase the rate of intercalation without the need to increase the cell's DC voltage across the electrolyte. The electrical conductivity along the graphene plane ($\sigma \sim 2.5$ E5 S/m) is three orders of magnitude greater than that between planes. This facilitates the energy to propagate primarily along the plane of Li ion diffusion, between the graphite edges that serve as entry and exist points for lithium ions. At slower frequencies (less than about 1000 Hz), the AC energy may augment the diffusion of ions directly, while at higher frequencies the AC energy may serve to further excite intercalating ions over energy barriers of surface diffusion and intercalation with less potential across the cell. As during pretreatment steps (discussed later), the application of the AC energy to the electrode avoids adverse effects of concentration polarization, including thickening of the SEI and disruption of the cathode. Increasing the intercalation rate can also enable the cell to be run more intensively with less risk of initiating lithium plating.

Electrolyte-Electrode Interface and SEI

The SEI, as explained above, is a layer comprised of byproducts that form as lithium reacts with components of organic electrolyte. It exists in all Li-ion, Li—Si, and Li-metal batteries except those that use inorganic membranes instead of organic membrane or electrolyte. The layer typically has a lower ionic conductivity and higher viscosity than the bulk electrolyte and dominates diffusion and charge transfer processes in the cell as a result. Lower conductivity and often higher permittivity also allow the AC/RF signal to propagate more uniformly across the electrode surface, resulting in less power being used for the AC/RF signal.

Ideally, the SEI is uniform across the entire electrode. As the electrode surface expands and contracts or develops rough features with battery cycling, the SEI may not adapt rapidly enough and can become thinner in some areas than others. This may be problematic in Li—Si batteries due to the electrode experiencing unusually large distortion between charge-discharge cycles. Because the SEI is a resistive barrier for dissolved Li in the electrolyte migrating to the electrode, more Li can diffuse through thinner areas of the SEI and deposit unevenly. Dominant ion transport channels can also form through the SEI and become the basis for dendrites.

One method to combat the thinning of the SEI on an electrode of a battery is to apply AC energy to the electrode. This energy may be applied during a charge cycle or when the battery is dormant to revive weakened portions or level the SEI layer. In general, the applied AC energy is partially absorbed by the SEI as it traverses the electrode surface. This may induce charge transfer reactions and accelerate the adaptation of the SEI to the changing electrode surface geometry. The AC can add a degree of mixing to the charge transfer activity that deters the onset of dominant ion transport channels. It can also increase the localized current density and cause deposits to become dense and less fragile, abating mossy or fractal dendrites which can break from the electrode surface, losing electrical contact to become "dead lithium."

Some lithium batteries may forego organic liquid electrolyte in favor of a conductive glass or polymer ion transport layer (frequently a membrane, but not always). In the absence of any electrolyte to react with the lithium, there may be no SEI. Dendrites are less problematic in this scenario, either because the surface is less susceptible to their formation or the solid ion transport layer physically blocks their continued growth toward the cathode. However, the electrode surface will continue to age and degrade. In these instances, the glass or polymer layer still provides a dielectric medium with low conductivity, and thus still facilitates the efficient propagation of AC energy for charge redistribution and the general prevention of surface non-uniformities.

The effect of the applied AC energy may be to thin or to thicken the SEI, depending upon conditions and waveform parameters to address many irregularities in the SEI layer. Control over one or the other may be most available when AC energy is applied while the cell is neither charging nor discharging, but rather in a dormant state.

Pre-Treatment of New Electrodes for Initial SEI Formation

An optimally evolved SEI layer on the anode is often critical to the performance of a lithium ion battery. Prior to distribution, manufacturers will subject the unpackaged electrode material, and later, the packaged electrodes, to a variety of time and energy-intensive pretreatment steps that usually span several weeks. Pre-treatment steps will often include cycling and heat and become energy and time intensive.

In general, the graphite of an electrode is porous and must be completely wetted by the electrolyte during an initialization phase to access the battery's full capacity. In many applications, however, the surface tension of the electrolyte makes this difficult and slow for small scale porosity at 200 nm or less. This porosity accounts for a substantial portion of the graphite's total surface area. Wetting is typically achieved under vacuum and heat over days to weeks, making it the slowest part of the pre-treatment process. Yet it is critical to later formation of an optimal SEI layer.

Later, the packaged electrodes undergo a series of slow charge-discharge cycles under a temperature control program to properly evolve an initial SEI layer that is dense, thin, electrically insulating, and comprised of non-reactive, non-soluble inorganic lithium species. This is known as formation cycling. These cycles are completed slowly, usually $1/10^{th}$ to $1/20^{th}$ the rate of a normal cycle (0.05 to 0.1 C). This contributes to a process lasting several weeks and involves significant use of energy. These steps involve both electrodes in a cell and the conditions that are needed to optimize the SEI at the anode are not ideal for the cathode. Formation cycling depletes the cathode of a portion of its lithium content, shortening the total battery life, before the cell reaches its end application.

The use of AC energy to excite the anode described in the methods above, either by transmissive or conductive application, provides a way of improving both electrode wetting and SEI formation steps in the battery manufacturing process. AC energy, particularly at higher frequencies, has the notable behavior of inducing strong localized electric field gradients, as well as much higher localized current densities. This type of localized energy density can be used to overcome the capillary forces that oppose complete electrolyte wetting of the graphite, requiring less or no time under vacuum and heat as the energy is applied directly to the graphite. Localized electrical and magnetic energy buildup can also stimulate charge transfer processes at one electrode only, evolving an optimal solid-electrolyte interphase at the anode without polarizing, depleting, or otherwise involving the cathode.

Because conductivity of graphite is much greater parallel to the graphene plane, the energy density at the edges will be relatively high at most frequencies of interest. As it is where most chemical reactions are occurring, and as the entry and exist point for intercalating Li ions, it is along the edges where the quality of the SEI is most impactful to the process. It is therefore useful from the standpoint of energy efficiency and propagation that the application of AC energy can be targeted to specific areas to provide the most benefit. Specifically, AC energy may be applied as a single electrode process to quickly develop the initial SEI at edges, with less concern for development elsewhere.

Energy Coupling with Dead Lithium

Figure 9:
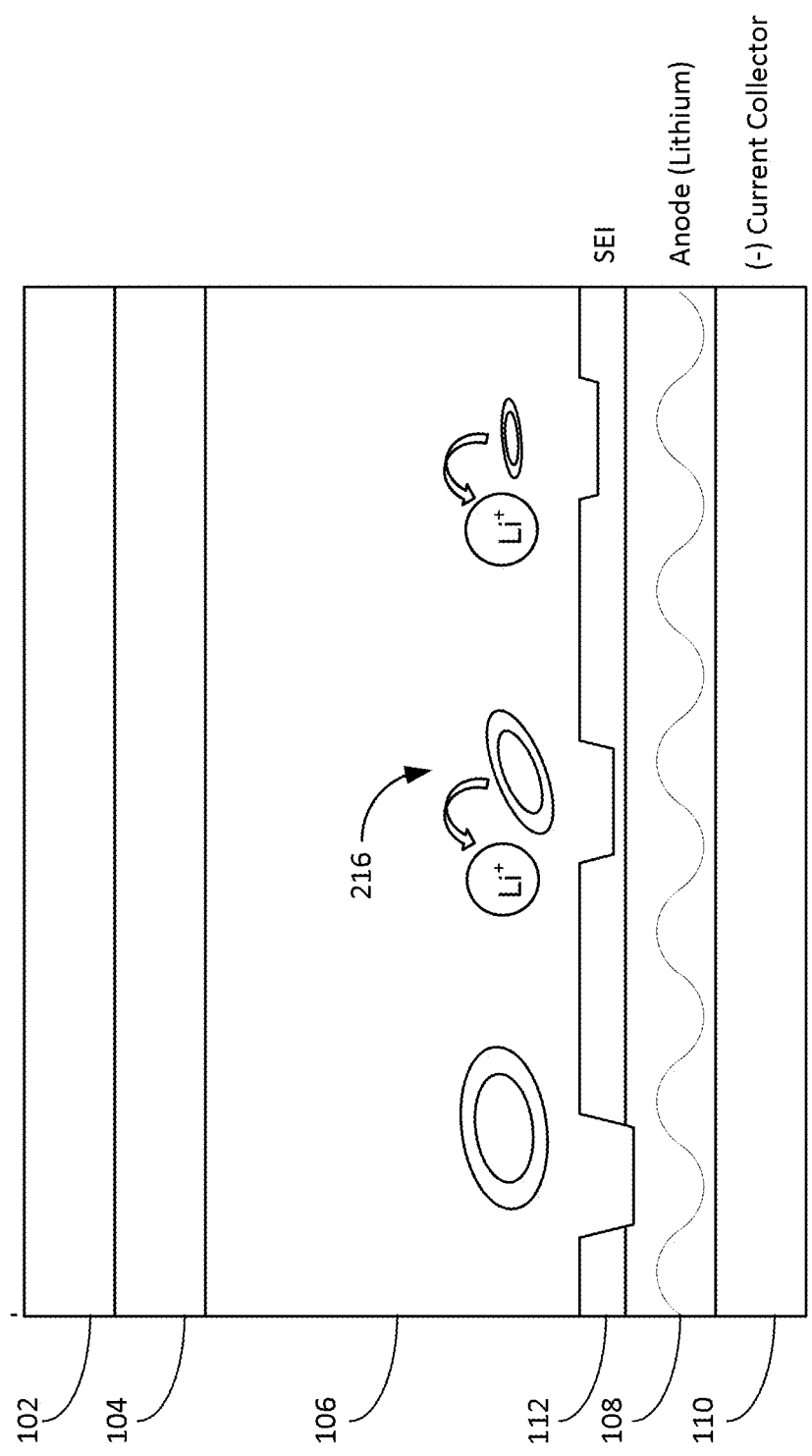
FIG. 9 depicts dead lithium and SEI damage of a battery anode due to dendrite growth at the surface of the electrode.

As described above, rough features may form on the electrode surface that are more fragile, such as mossy and fractal lithium. They may eventually break from the surface and lose electrical contact. FIG. 9 illustrates such dead lithium in the electrolyte layer 108 of the battery due to fragile dendrite growth on the anode 108. The stored energy potential of this lithium mass is no longer available for power storage and battery capacity is permanently lost when such masses form.

The method for providing AC energy to the anode 108 may aid in dissolving these dead lithium masses back into the electrolyte 106 and restoring the energy potential of the battery 100. In particular, the AC energy can non-conductively induce charges into dead lithium that initiate dissolution into the electrolyte 106. Capacitive or inductive coupling can occur close to the surface depending upon frequency. Closest to the surface, electric or magnetic energy will dominate and a large portion of the energy will be reactive. If dead material is farther from the surface, the mechanism of energy transfer will be dominated by more coherently radiated energy. These two mechanisms approximately correspond to the near field and far field regions of a radiating body, respectively. Even in the case of radiated energy, the dead matter will have its own near-surface coupling phenomena that results in reactive energy. By inducing current into the dead matter, local current density can be sufficiently increased for charge transfer processes and dissolution. In a dissolved state, the matter is once again accessible for energy storage.

Reabsorption may be monitored in various ways. For example, over various charge and discharge cycles, with AC energy applied during charge and/or distinctly, storage capacity may be monitored each successive cycle. In some instances, capacity may be compared to a stored capacity value set or measured initially when the battery is put into service, or may be compared to a trend of measurement over time (e.g., decreasing capacity or distinct decreases in capacity over time, as compared to increases in capacity after reabsorption processing). Reabsorption may also be determined based on cell resistance with a decrease in resistance relative to a previously measured value indicating reabsorption of dead material present at the time of the previously measured value.

Single Point of Contact

Figures 10A, 10B, 10C:
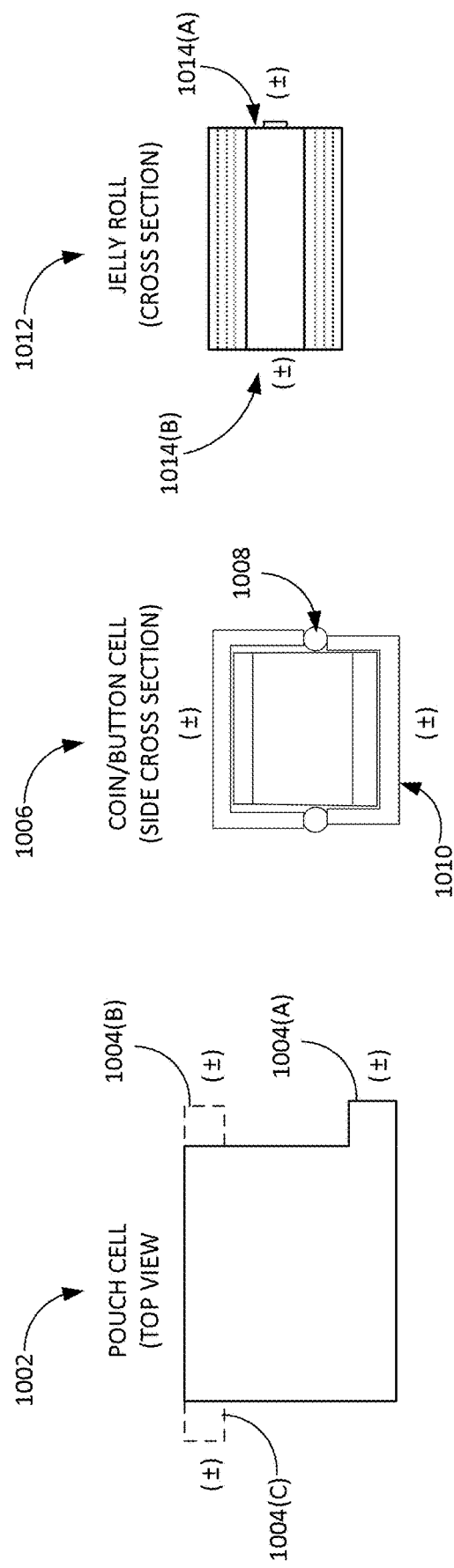
FIGS. 10A-10C depicts common battery cell constructions.

Batteries traditionally only have one point of electrical contact with an electrode. For example, FIGS. 10A-10C illustrate three common cell or battery formats and the externally accessible points of electrical contact. In particular, FIG. 10A illustrates a top view of a pouch cell 1002 that includes sheets of electrodes and ion transport layers which are cut to specific dimensions. The cutout for the electrodes includes a tab 1004 that can be accessed for providing electrical contact. In some cases, additional tabs may be added at different points to enable multiple points of contact, if needed. However, typically there is only a single point of electrical contact 1004 per electrode. In the example illustrated, a first tab 1004(A) is to the counter-electrode, and a second tab 1004(B) is to working electrode (e.g., anode). AC energy may be coupled at the tab 1004(b) or a separate tab 1004(C) may provide a connection point to the working electrode. Alternatively, AC energy may be applied across or between tabs on the same electrode, such that an AC(+) connection is made at one tab and an AC(−) connection is made at another tab.

FIG. 10B illustrates a representative section view of a coin or button battery cell 1006 that contains standard layers inside a 'can.' The top and bottom of the can are electrically insulated from one another by a gasket 1008. A single point of electrical contact 1010 is made by touching the bottom of the can anywhere within the area. The can is in direct electrical contact with the current collector layers (usually aluminum at the cathode and copper at the anode). FIG. 10C illustrates a "jelly roll" battery 1012 that is based upon rolled multilayers most similar to the pouch cell 1002. But the packaging typically restricts to a single point 1014(A) and 1014(B) of electrical contact per electrode, as with the coin cell.

Although batteries provide a single contact point to the anode, the AC energy discussed herein may still be applied to achieve the performance results of the battery. For example, FIG. 11 illustrates a single point contact providing AC energy to an anode 1106 of a coin or button battery cell 1008. 3D views showing an EM pulse (1108 and 1110) propagating across the anode surface at different times and from different single contact points (A—centered 1102, B—offset 1104). In general, when the wavelength >>anode diameter, location of the contact point is less important. When wavelength ≤anode diameter, reflections along the boundaries of the electrode will contribute to more complex patterns and standing waves across the surface. Thus, because batteries are often limited to a single point of contact, consideration is made to the effect on the standing AC wave created based on the location of the single point of contact on the anode.

Transmitted RF Signal

Instead of being conducted via a source in direct electrical contact, AC/RF may be transmitted to the electrode over a distance to induce similar benefits as described herein. In this case, the directivity of the transmitter and the orientation of the electrode within the radiated field are the primary considerations. In some implementations, such as large battery packs, anode access may be limited or challenging. In such circumstances, strategically placed transmitters may be positioned throughout the battery pack to radiate AC signals to the electrodes of the cells in the battery pack. In some situations, shielding or directional antennas may be deployed to shield the cathode or otherwise only direct energy to the anode in circumstances where the anode is the only target.

Anode and Cathode Independent Modulation

In some instances, the AC signal may not necessarily be applied proportionally or inverse-proportionally at both the anode and cathode of a battery. Rather, a signal input at the cathode may affect the anode via conductance, coupling, or transmission (depending on frequency), and vice versa. In such cases, AC energy can be used to cause battery healing (homogenization of the electrode/electrolyte interface) whether the battery is active or dormant. If the AC signal is sufficient to induce localized diffusive and charge transfer processes, homogenization can occur at an electrode regardless of whether the battery is charging, discharging, or resting.

The frequency and power of the AC energy should be chosen so as to achieve the desired effect (dendrite prevention, SEI thinning or thickening, ion intercalation, etc.) in the most energy efficiency manner possible. Overall process efficiency is important to battery charging and in most applications small decreases in efficiency carry significant implications for the application. Calculation of overall efficiency requires combining the energy input between both electrodes (DC, standard) with that used for AC energy, as a ratio against the storage capacity, lifetime (total cycles), or similar metric of the battery. In one instance, AC may increase ion intercalation, lowering the galvanic potential required. In another instance, AC energy may improve the healing rate of the SEI following structural changes in the electrode, increasing the battery's lifetime. The benefit of additional energy for the AC signal must be weighed against these outcomes case by case.

Situations involving fast charging, particularly for large systems such as EV battery packs or stationary applications, may be more tolerant of additional energy for the AC input because the energy requirements of the DC input are already high (the relative additional burden on the system may be low). When charging, the AC input may be targeted to deter dendrite formation and the development of uneven porosity in the SEI (including ion channels), and increase Li diffusion without (or despite) increasing the cell potential. It may also regulate SEI growth and prevent the layer from becoming too thick. As the cell is discharging, stimulating ion diffusion out of the graphite remains valuable.

AC energy applied during discharge or when the cell is dormant may also provide a calmer environment for the SEI to be healed (re-form at areas of electrode deformation, or re-densify after conditions that have caused the SEI to become porous), and regain uniformity after aggressive charge cycles or operating conditions. Further, dead lithium and existing dendrites may be dissolved at any of these stages.

Electrokinetic Flow and Diffusive Effects

Electrodynamic behavior as the AC energy propagates across the electrode can give rise to electrokinetic effects at the electrode|electrolyte, electrode|SEI, SEI and SEI|electrolyte interfaces. The nature of these effects depend upon the material properties of one layer relative to the other at an interface. For example, high frequencies well outside of conventional consideration, such as 100 GHz, when applied at an electrode can alter steady state diffusion patterns in the electrolyte near the surface. The exact pattern is frequency dependent.

As previously discussed, the magnitude of the localized charge density, electron pathways, and the local electric field gradient all depend upon the frequency and generally increase proportionally. Exceptions may arise under certain conditions of resonance (energy becomes capacitive or inductive in nature) or energy absorption by the surrounding environment. When the applied frequency is slower than the charge relaxation time of a layer, conduction mechanisms will dominate the passing of charge to and from the interface. If conduction dominates in one layer but not the other then the interface will become polarized. If the applied frequency is faster than a layer's charge relaxation time then interfacial polarization will be proportional to the difference in the permittivity of the two layers.

The basic behavior of any interface in response to AC energy can be estimated based upon the general guidelines above and the relative properties of all layers. This can be the simplest basis for starting to determine a proper waveform to achieve a particular effect:

Electrode (Lithium): High conductivity, Low Permittivity
SEI: Low conductivity, Medium permittivity
Organic Electrolyte: Medium conductivity, Medium-High permittivity.

Regardless of which interface is considered, at frequencies approaching or exceeding resonance across the interface's dimensions or features, the affects becomes mixed and spatially dependent—i.e., localized. The correct frequency and power may induce dielectrophoretic forces that create patterns of diffusion at or near the surface. Stated differently, the frequency and power of a given AC energy application can be based upon the difference in electric and dielectric properties of the materials inside the battery.

Engineered Battery Cells

In the cases discussed thus far, the nature of the applied energy and mechanism of its effect on diffusive and charge transfer processes may depend upon the relationship of the applied wavelength compared to the dimensions of the electrode. Specifically, how resonant is the electrode, or features on the electrode, at the applied frequency. This is the appropriate focus for battery systems whose electrochemical behavior should be modified by the process without changes to the cell's geometry or design.

Figure 12:
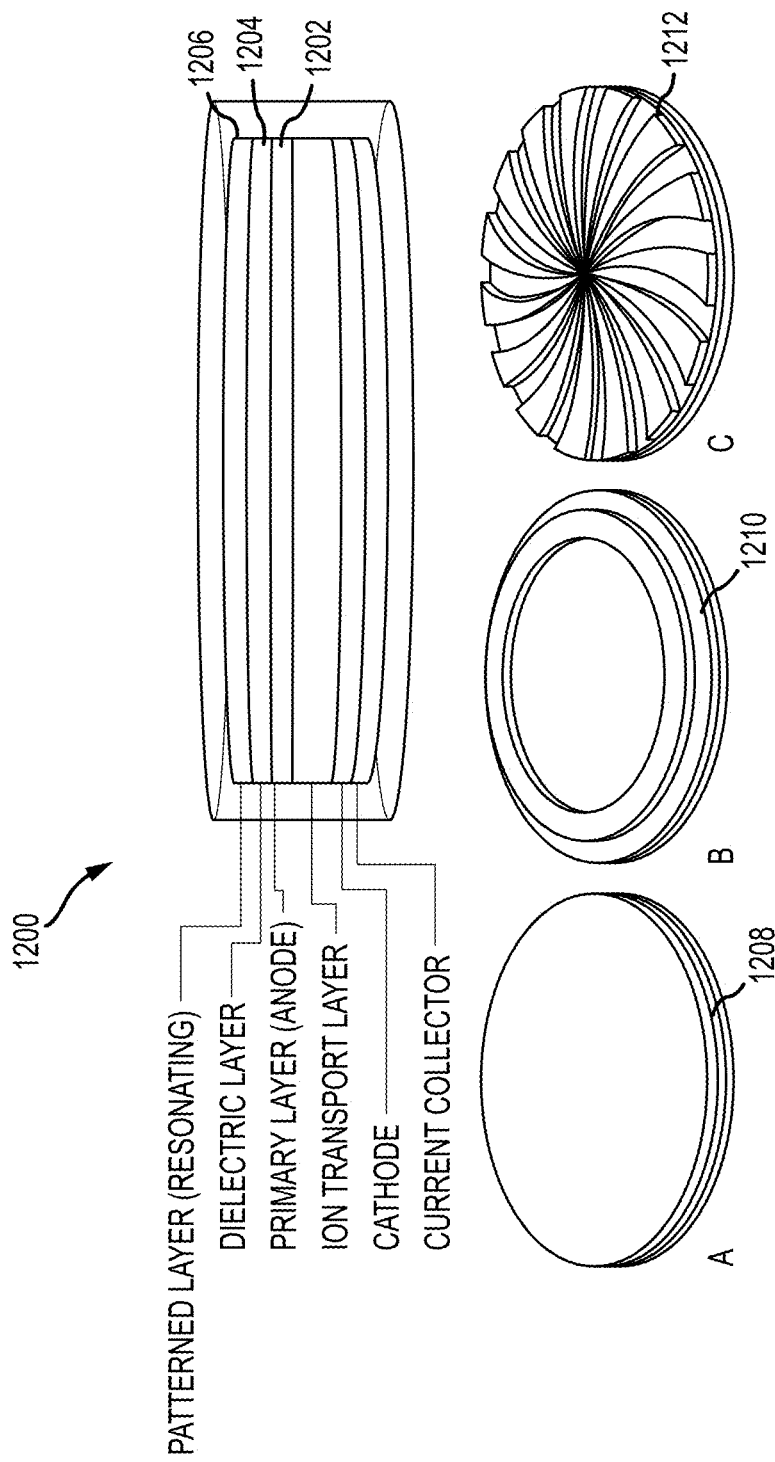
FIG. 12 depicts component layers of a modified coin battery cell.

In cases where the battery can be re-engineered, a tailored (patterned) resonating layer can be added in close proximity to the electrode to guide or form the energy applied to the surface of the electrode. For example, FIG. 12 illustrates component layers for a coin cell battery format 1200. In this manufactured cell, the anode 1202 is modified with a dielectric 1204 and a conductive/patterned layer 1206 for electrical coupling with the primary conductive layer. Examples pattern layers A-C 1218-1212 shows various patterned layers that may be included in the coin cell 1200. As shown, the geometry of the patterned layer 1208 matches the primary layer in example A. In example B, the patterned layer 1210 contains a ring to couple more strongly with magnetic energy. In example C, the patterned layer 1212 contains a complex geometry to control the resonant frequency and induce specific patterns of current density at the primary electrode. In general, the patterned layer 1206 may take any shape and size to form or create the AC wave applied to the anode of the cell.

In the case of a modified battery cell, DC energy may be applied to the primary conductive layer 1202 in contact with electrolyte, while AC is applied to the patterned layer 1206. The patterned layer 1206 is designed with a unique conductive pathway with desired resonant behavior that may or may not be similar to the primary conductive layer. A given battery layer, and particularly electrode of a battery, will resonate based on dimensions and material characteristics of the layer. The patterned layer can be tailored to resonate, and interact with the target battery layer to effect overall resonance in the presence of an AC signal. In one example, computer simulation may be used to develop a specific pattern for any given application, and tune or otherwise adjust the pattern for the overall intended impact on dendrite suppression and the like. AC energy applied to a carefully patterned conductive layer can be made to flow in unique directions that don't necessarily match the pattern. If the patterned layer is separate from the electrode by a thin dielectric layer, then the electric and magnetic fields that arise from the AC energy on the patterned layer will travel through the dielectric layer and impact the electric and magnetic fields on the disc electrode.

In a different case, the primary conductive layer 1202 may be connected to the patterned conductive layer 1206 via one or more conductive channels through or around the dielectric layer so that DC and AC can be applied at a single point and reach both layers. In this case, the resonant behavior of the primary conductive layer 1202 is modified, and possibly dominated, by coupling with the patterned layer 1206. The patterned layer 1206 may also still affect electrochemical processes on the primary conductive layer 1202 when only the primary conductive layer receives DC and/or AC conductive input.

The patterned layer may take many forms, as discussed. The resonant behavior in example A 1208 would be fixed even as the primary layer underwent changes during operation of the battery. Coupling would occur across the dielectric layer between the conductive layers. This would also allow the AC signal to propagate more uniformly without attenuation due to the conductive electrolyte. In another instance, the patterned layer may be a closed loop that is coupled more strongly with magnetic energy at applied AC frequencies, as would be case with example B 1210.

In another instance, the patterned layer may entail a complex geometry that shifts the strongest capacitive-inductive transitions (for example, shift resonant points to lower frequencies). The geometry may also induce unique, patterned regions of electromagnetic behavior onto the primary conductive layer (example C 1212). In one very particular case, the pattern may affect a spoof surface plasmon polariton that induces directional patterns of current displacement. Patterned layer may be subject to no direct conductive input, and instead impact the electrochemical processes at the primary conductive layer entirely through coupling.

Other Battery Types

Zinc batteries have similar or better energy capacity than lithium ion (particularly zinc-air batteries). Zinc and lithium are both negative metals and when utilized in batteries, they face similar issues with dendrites. A primary difference is that zinc can be used in aqueous (usually alkaline) environments. Dendrites are also a major obstacle in the ability to cycle Zn electrodes in rechargeable zinc batteries. They form readily and can damage or short the anode and cathode. Dendrite suppression may be achieved by the use of organic additives in the electrolyte, which ultimately become co-deposited into the electrode and depleted. Small concentrations of various metals or metal oxides may also be added to the zinc electrode surface directly to affect the solubility and mobility of reversible byproducts, maintaining a more uniform surface during cycling. To prevent the need for these types of additives, the processes and methods described herein may be used to suppress dendrite formation and homogenize the surface of zinc electrodes in rechargeable zinc batteries.

Regarding lead-acid batteries, the methods described herein may be modified to account for the configuration of the electrochemical cell and its electrochemistry. Unlike a lithium-based battery, both the anode and the cathode plate and corrode during charge and discharge. Existing cells have only two ports, so the transverse current is sent in one port calculated to reflect off the far wall of the cell and back to the port of entry. The waveform of the transverse current is thus swept through several frequencies to achieve relative balanced time-averaged current distribution across the anode and cathode surfaces of the lead acid battery.

Having described several embodiments, it will be recognized by those skilled in the art that various modifications, alternative constructions, and equivalents may be used without departing from the spirit of the disclosure. And several well-known processes and elements have not been described to avoid unnecessarily obscuring the embodiments disclosed. So the above description should not be taken as limiting the document.

Those skilled in the art will appreciate that the disclosed embodiments teach for example and not by limitation. Therefore, the matter in the above description or shown in the drawings should be interpreted as illustrative and not in a limiting sense. These claims should cover all generic and specific features described, and all statements of the present method and system, which, as a matter of language, might be said to fall therebetween.

What is claimed is:

1. A method comprising:
applying an alternating current (AC) electrical waveform to an electrode of a battery cell comprising a plurality of layers, the AC electrical waveform inducing an electrodynamic effect in at least one layer of the plurality of layers of the battery cell.

2. The method of claim 1 wherein the electrodynamic effect comprises an electrokinetic effect.

3. The method of claim 1 further comprising:
in the presence of the AC waveform, applying a charging current to the electrode of the battery cell, the charging current different from the AC electrical waveform.

4. The method of claim 1 wherein the electrode of the battery cell is an anode.

5. The method of claim 4 wherein the at least one layer of the plurality of layers of the battery cell comprises a solid electrolyte interphase (SEI) layer between the anode and an electrolyte layer.

6. The method of claim 5 wherein the electrodynamic effect on the SEI layer comprises reducing a growth of one or more dendrites within the SEI layer.

7. The method of claim 1 wherein the electrodynamic effect comprises dissolving a deposit of metal in an electrolyte layer of the battery cell, the deposit of metal not in conductive electrical communication with the electrode of the battery cell.

8. The method of claim 1 wherein the induced electrodynamic effect comprises shifting a plurality of high current density areas and a plurality of low current density areas on a surface of the electrode.

9. The method of claim 1 wherein the AC electrical waveform is applied to the electrode of the battery cell through a single point of contact with the electrode.

10. The method of claim 1 wherein the AC electrical waveform is applied to the electrode of the battery cell through radiation of the AC electrical waveform.

11. The method of claim 1 wherein the electrode comprises graphite and the electrodynamic effect comprises inducing whetting of the graphite electrode.

12. The method of claim 1 wherein the AC electrical waveform comprises one of a continuous wave, a pulsed wave, or a continuously changing wave.

13. The method of claim 1 wherein the electrodynamic effect comprises localized current densities and potential gradients on the electrode of the battery cell.

14. The method of claim 1 wherein the battery cell comprises one of a lithium ion battery, a lithium metal battery, a lithium silicon battery, a zinc battery, a nickel battery, or a lead acid battery.

15. The method of claim 1 wherein the plurality of layers of the battery cell comprises at least a dielectric layer adjacent the electrode and a modified conductive layer configured to alter a potential and charge distribution at an electrode interface.

16. The method of claim 1 wherein the electrodynamic effect comprises suppressing and dissolving one or more dendrites attached to a surface of the electrode.

* * * * *